(12) United States Patent
Kim et al.

(10) Patent No.: US 11,356,879 B2
(45) Date of Patent: Jun. 7, 2022

(54) METHOD AND APPARATUS FOR MEASURING FREQUENCY IN WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/826,015

(22) Filed: Mar. 20, 2020

(65) Prior Publication Data

US 2020/0305014 A1    Sep. 24, 2020

(30) Foreign Application Priority Data

Mar. 21, 2019    (KR) .................. 10-2019-0032542

(51) Int. Cl.
*H04W 24/10*    (2009.01)
*H04W 76/19*    (2018.01)
(Continued)

(52) U.S. Cl.
CPC .......... *H04W 24/10* (2013.01); *H04W 76/19* (2018.02); *H04W 76/27* (2018.02); *H04W 76/30* (2018.02)

(58) Field of Classification Search
CPC ......... H04W 36/0072; H04W 36/0083; H04W 36/08; H04W 76/10; H04W 76/30;
(Continued)

(56) References Cited

U.S. PATENT DOCUMENTS 9,924,422 B2 * 3/2018 Kim .................. H04W 36/0088
2012/0004010 A1 * 1/2012 Tamura ............. H04W 36/0038
455/525
(Continued)

FOREIGN PATENT DOCUMENTS

KR    10-2018-0033443 A    4/2018
KR    10-2018-0137385 A    12/2018

OTHER PUBLICATIONS

ZTE Corporation, et al., "Early measurement reporting for RRC idle and inactive state", 3GPP TSG-RAN WG2 Meeting #105, Feb. 25-Mar. 1, 2019, R2-1900801, 7 pages.
(Continued)

*Primary Examiner* — Jean A Gelin

(57) ABSTRACT

A frequency measurement method performed by a user equipment (UE) in a wireless communication system is provided. The frequency measurement method includes: receiving a radio resource control (RRC) release message or system information including first frequency measurement configuration information for frequency measurement in an RRC inactive mode; performing frequency measurement in the RRC inactive mode based on the first frequency measurement configuration information; receiving first RRC resume message including an indicator requesting a measurement report in the RRC inactive mode; and transmitting an RRC resume complete message including the measurement report based on the indicator.

10 Claims, 14 Drawing Sheets

(51) Int. Cl.
*H04W 76/30* (2018.01)
*H04W 76/27* (2018.01)

(58) Field of Classification Search
CPC ..... H04W 76/32; H04W 76/34; H04W 76/38; H04W 76/40; H04W 24/10; H04W 76/19; H04W 76/27
See application file for complete search history.

(56) References Cited

U.S. PATENT DOCUMENTS

| | | | | |
|---|---|---|---|---|
| 2012/0099466 | A1* | 4/2012 | Aoyama | H04L 5/0091 370/252 |
| 2015/0264602 | A1* | 9/2015 | Hageltorn | H04W 36/0016 455/436 |
| 2015/0289156 | A1* | 10/2015 | Jung | H04W 24/10 370/252 |
| 2015/0358477 | A1* | 12/2015 | Jeong | H04W 48/04 370/259 |
| 2016/0285716 | A1* | 9/2016 | Pelletier | H04L 43/0811 |
| 2016/0316508 | A1* | 10/2016 | Hong | H04W 76/15 |
| 2017/0070896 | A1* | 3/2017 | Shindo | H04W 36/14 |
| 2017/0078872 | A1* | 3/2017 | Liao | H04W 12/037 |
| 2017/0289875 | A1* | 10/2017 | Cui | H04W 36/08 |
| 2018/0077624 | A1* | 3/2018 | Jung | H04W 52/0225 |
| 2018/0242208 | A1* | 8/2018 | Ku | H04W 48/12 |
| 2018/0368016 | A1* | 12/2018 | Lee | H04B 17/318 |
| 2018/0368018 | A1 | 12/2018 | Kim et al. | |
| 2019/0021058 | A1 | 1/2019 | Cheng et al. | |
| 2019/0037634 | A1* | 1/2019 | Kadiri | H04W 76/15 |
| 2019/0239031 | A1* | 8/2019 | Li | H04W 24/10 |
| 2019/0324936 | A1* | 10/2019 | Coddington | H04L 43/106 |
| 2020/0053812 | A1* | 2/2020 | Wu | H04W 24/10 |
| 2020/0196234 | A1* | 6/2020 | Turtinen | H04W 52/0274 |
| 2020/0351684 | A1* | 11/2020 | Futaki | H04B 17/318 |
| 2020/0351723 | A1* | 11/2020 | Kim | H04W 68/005 |
| 2020/0396633 | A1* | 12/2020 | Tseng | H04W 72/0453 |

OTHER PUBLICATIONS

Huawei, et al., "Remaining issues on state transition between RRC Connected and Inactive", 3GPP TSG-RAN WG2 Meeting #101 bis, Apr. 16-20, 2018, R2-1805322, 5 pages.
Intel Corporation, "RRC Inactive state for eMTC and NB-IoT", 3GPP TSG RAN WG2 Meeting #105, Feb. 25-Mar. 1, 2019, R2-1900887, 4 pages.
Qualcomm Incorporated, "Supporting early measurement reporting in NR", 3GPP TSG RAN WG2 Meeting #105, Feb. 25-Mar. 1, 2019, R2-1900104, 6 pages.
Notification of Transmittal of the International Search Report and the Written Opinion of the International Searching Authority, or the Declaration dated Jun. 29, 2020 in connection with International Patent Application No. PCT/KR2020/003642, 9 pages.
European Patent Office, "Supplementary European Search Report" dated Apr. 29, 2022, in connection with European Patent Application No. 20773374.2, 11 pages.
ZTE: "Consideration on the Ran Area Update Procedure", 3GPP TSG RAN WG2#NR_AdHoc#2, R2-1706674, Qingdao, China, Jun. 2017, 3 pages.
Panasonic: "Measurement Functionality split for Broadcast and Dedicated", 3GPP TSG RAN WG2 #56bis, R2-070090, Jan. 2007, Sorrento, Italy, 7 pages.

* cited by examiner

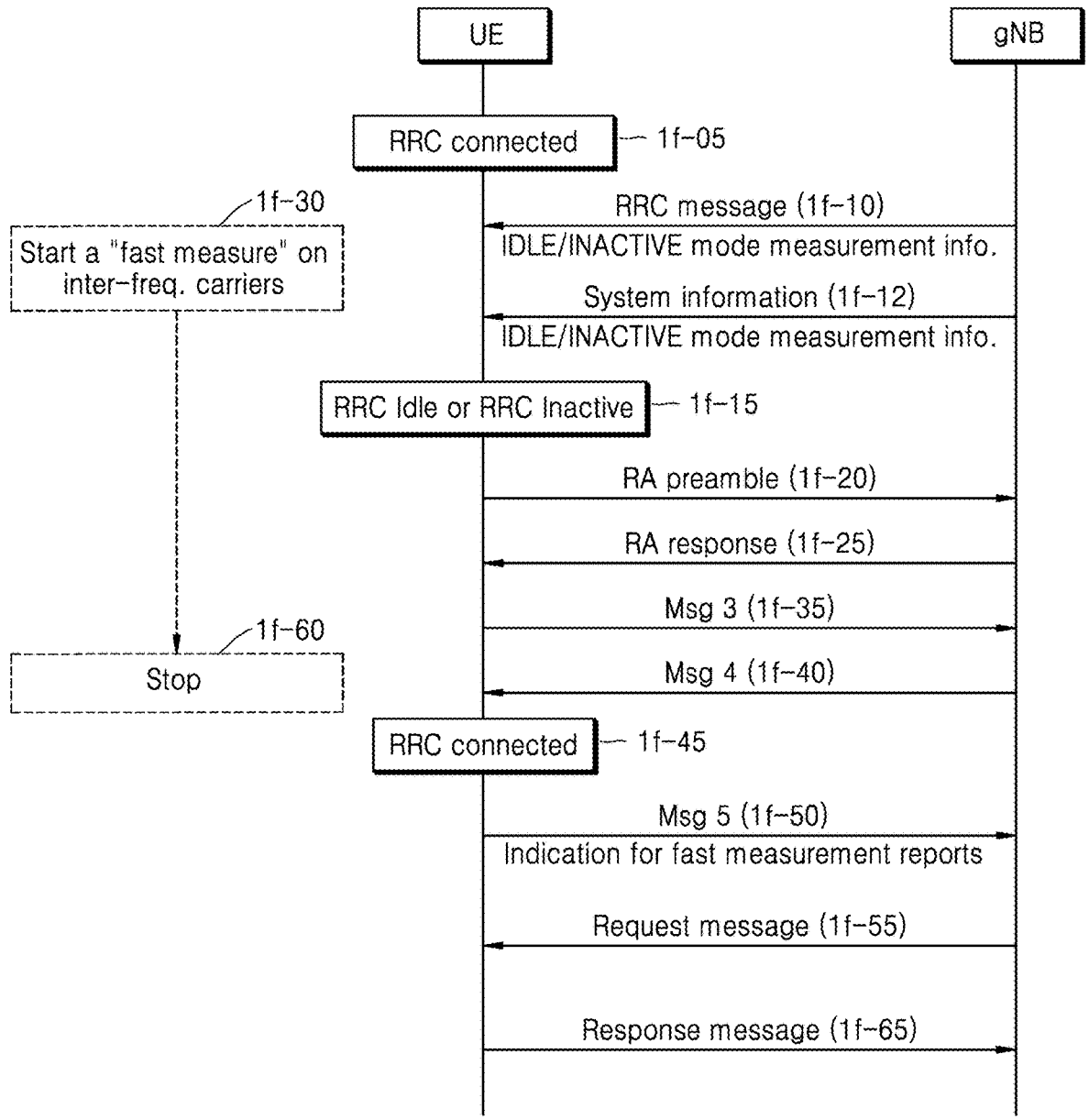

METHOD AND APPARATUS FOR MEASURING FREQUENCY IN WIRELESS COMMUNICATION SYSTEM

CROSS-REFERENCE TO RELATED APPLICATION

This application is based on and claims priority under 35 U.S.C. § 119 to Korean Patent Application No. 10-2019-0032542, filed on Mar. 21, 2019, in the Korean Intellectual Property Office, the disclosure of which is incorporated herein by reference in its entirety.

BACKGROUND

1. Field

The disclosure relates to a method and apparatus for measuring a frequency in a wireless communication system.

2. Description of the Related Art

In order to meet the increasing demand with respect to wireless data traffic after the commercialization of 4G communication systems, efforts have been made to develop improved 5G communication systems or pre-5G communication systems. For this reason, 5G communication systems or pre-5G communication systems are called beyond 4G network communication systems or post LTE systems. 5G communication systems standardized in the 3rd generation partnership project (3GPP) are called new radio (NR) systems. In order to achieve a high data transmission rate, consideration is given to implementing 5G communication systems in millimeter wave (mmW) frequency bands (e.g., 60 GHz bands). In order to reduce path loss and increase a transmission distance in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, developments of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation are underway. Furthermore, in 5G communication systems, developments of an advanced coding modulation (ACM) scheme such as hybrid FSK and QAM modulation (FQAM) and sliding window superposition coding (SWSC) and an enhanced network access scheme such as filter bank multi carrier (FBMC), non-orthogonal multiple access (NOMA), or sparse code multiple access (SCMA) are underway.

The Internet is being developed from a human-based network via which humans generate and consume information to an internet of things (IoT) network via which distributed components, such as things, transmit or receive information to or from each other and process the information. Internet of everything (IoE) technology in which big data processing technology is combined with IoT technology via connection with a cloud server or the like, is emerging. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied. In IoT environments, an intelligent internet technology (IT) service for collecting and analyzing data generated by connected things and creating a new value in human life may be provided. IoT is applicable to various fields, such as smart home, smart building, smart city, smart car or connected car, smart grid, health care, smart home appliances, and advanced medical care, via convergence and combination of existing information technology (IT) with various industries.

Accordingly, various attempts are being made to apply 5G communication systems to IoT networks. For example, 5G communication such as a sensor network, M2M communication, or MTC is implemented by technology such as beam-forming, MIMO, or array antenna. The application of a cloud RAN as big data processing technology may also be considered as an example of convergence of 5G technology and IoT technology.

Due to developments in wireless communication systems, methods allowing terminals to fast measure a frequency and report a result of the measurement are required.

SUMMARY

A method and apparatus for measuring a frequency in a wireless communication system is provided.

Additional aspects will be set forth in part in the description which follows and, in part, will be apparent from the description, or may be learned by practice of the presented embodiments of the disclosure.

According to an embodiment of the disclosure, a frequency measurement method performed by a user equipment (UE) in a wireless communication system includes receiving a radio resource control (RRC) release message or system information including first frequency measurement configuration information for frequency measurement in an RRC inactive mode; performing frequency measurement in the RRC inactive mode, based on the first frequency measurement configuration information; receiving first RRC resume message including an indicator requesting a measurement report in the RRC inactive mode; and transmitting an RRC resume complete message including the measurement report, based on the indicator.

The first frequency measurement configuration information for the frequency measurement may include at least one of a period to perform frequency measurement, at least one frequency measurement information group or list, a timer value for frequency measurement, information about a validity area on which frequency measurement is to be performed, or a threshold value for reporting the measurement report.

The frequency measurement method may further include receiving an RRC release message including radio access network (RAN) notification area update information in a RAN notification area update procedure; when new second frequency measurement configuration information is included in the RRC release message, updating the first frequency measurement configuration information to the second frequency measurement configuration information; and performing frequency measurement in the RRC inactive mode, based on the second frequency measurement configuration information.

The frequency measurement method may further include, when the new second frequency measurement configuration information is not included in the RRC release message including the RAN notification area update information, performing frequency measurement in the RRC inactive mode, based on the first frequency measurement configuration information.

The frequency measurement method may further include receiving an RRC setup message indicating the UE to fall back to an RRC idle mode; and when system information of a currently camped-on cell includes an indicator indicating that frequency measurement in the RRC idle mode or in the RRC inactive mode measurement is supported, and the measurement report in the RRC inactive mode exists, transmitting an RRC setup complete message including the measurement report in the RRC inactive mode in response to the RRC setup message.

A frequency measurement report reception method performed by a base station in a wireless communication system includes transmitting or broadcasting an RRC release message or system information including first frequency measurement configuration information for frequency measurement in an RRC inactive mode; transmitting first RRC resume message including an indicator requesting a measurement report in the RRC inactive mode; and receiving an RRC resume complete message including the measurement report.

The first frequency measurement configuration information for the frequency measurement may include at least one of a period to perform frequency measurement, at least one frequency measurement information group or list, a timer value for frequency measurement, information about a validity area on which frequency measurement is to be performed, or a threshold value for reporting the measurement report.

The frequency measurement report reception method may further include transmitting an RRC release message including RAN notification area update information in a RAN notification area update procedure, and the RRC release message may include new second frequency measurement configuration information, when a UE is configured to perform frequency measurement in the RRC inactive mode.

The frequency measurement report reception method may further include broadcasting system information including an indicator indicating that the frequency measurement in an RRC idle mode or the RRC inactive mode is supported; transmitting an RRC setup message indicating the UE to fall back to the RRC idle mode; and receiving an RRC setup complete message including the measurement report in the RRC idle mode or the RRC inactive mode, in response to the RRC setup message.

According to another embodiment of the disclosure, a UE for performing frequency measurement in a wireless communication system includes a transceiver; and a controller configured to control the UE to receive an RRC release message or system information including first frequency measurement configuration information for frequency measurement in an RRC inactive mode, perform frequency measurement in the RRC inactive mode, based on the first frequency measurement configuration information, receive first RRC resume message including an indicator requesting a measurement report in the RRC inactive mode, and transmit an RRC resume complete message including the measurement report, based on the indicator.

The first frequency measurement configuration information for the frequency measurement may include at least one of a period to perform frequency measurement, at least one frequency measurement information group or list, a timer value for frequency measurement, information about a validity area on which frequency measurement is to be performed, or a threshold value for reporting the measurement report.

The controller may be further configured to control the UE to: receive an RRC release message including RAN notification area update information in a RAN notification area update procedure; when new second frequency measurement configuration information is included in the RRC release message, update the first frequency measurement configuration information to the second frequency measurement configuration information; and perform frequency measurement in the RRC inactive mode, based on the second frequency measurement configuration information.

The controller may be further configured to control the UE to, when the new second frequency measurement configuration information is not included in the RRC release message including the RAN notification area update information, perform frequency measurement in the RRC inactive mode, based on the first frequency measurement configuration information.

The controller may be further configured to control the UE to: receive an RRC setup message indicating the UE to fall back to an RRC idle mode; and, when system information of a currently camped-on cell includes an indicator indicating that frequency measurement in the RRC idle mode or in the RRC inactive mode measurement is supported, and the measurement report in the RRC inactive mode exists, transmit an RRC setup complete message including the measurement report in the RRC inactive mode in response to the RRC setup message.

According to another embodiment of the disclosure, a base station for receiving a frequency measurement report in a wireless communication system includes a transceiver; and a controller configured to control the base station to: transmit or broadcast an RRC release message or system information including first frequency measurement configuration information for frequency measurement in an RRC inactive mode; transmit a first RRC resume message including an indicator requesting to report a measurement report in the RRC inactive mode; and receive an RRC resume complete message including the measurement report.

The first frequency measurement configuration information for the frequency measurement may include at least one of a period to perform frequency measurement, at least one frequency measurement information group or list, a timer value for frequency measurement, information about a validity area on which frequency measurement is to be performed, or a threshold value for reporting the measurement report.

The controller may be further configured to control the base station to transmit an RRC release message including radio access network (RAN) notification area update information in a RAN notification area update procedure, and the RRC release message may include new second frequency measurement configuration information, when a UE is configured to perform frequency measurement in the RRC inactive mode.

The controller may be further configured to control the base station to: broadcast system information including an indicator indicating that the frequency measurement in an RRC idle mode or the RRC inactive mode is supported; transmit an RRC setup message indicating the UE to fall back to the RRC idle mode; and receive an RRC setup complete message including the measurement report in the RRC idle mode or the RRC inactive mode, in response to the RRC setup message.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1F illustrates a procedure between a UE and a gNB where UE performs early frequency measurement in the RRC idle mode or the RRC inactive mode and transmit a fast measurement report according to an embodiment of the disclosure;

DETAILED DESCRIPTION

Figure 1A:
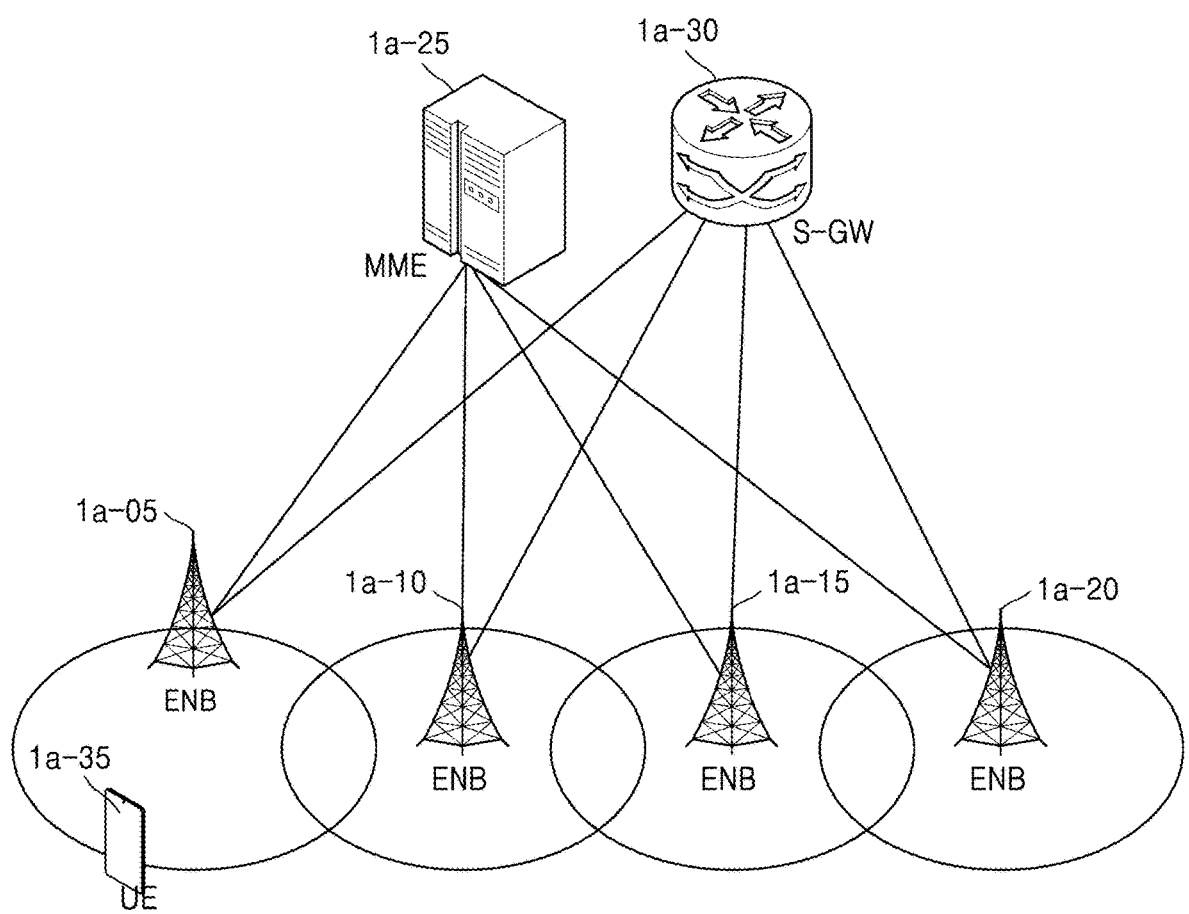
FIG. 1A illustrates a structure of a long term evolution (LTE) system according to an embodiment of the disclosure.
Figure 1B:
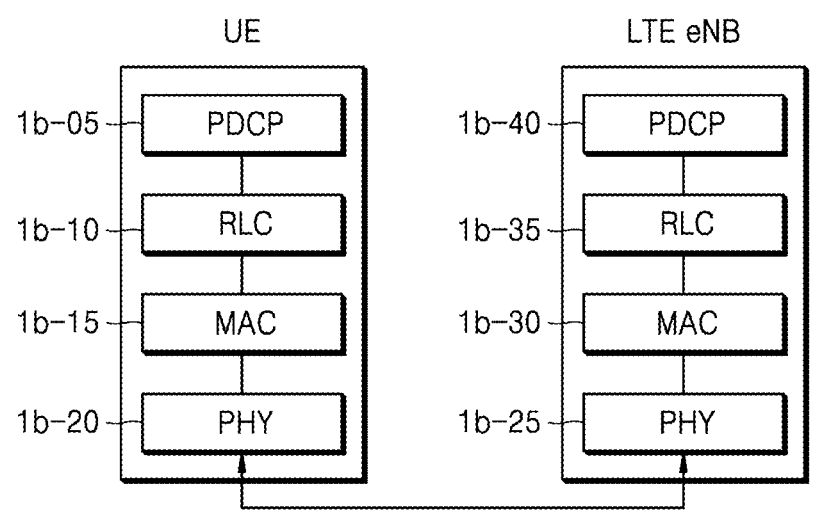
FIG. 1B illustrates a radio protocol architecture in an LTE system according to an embodiment of the disclosure.
Figure 1C:
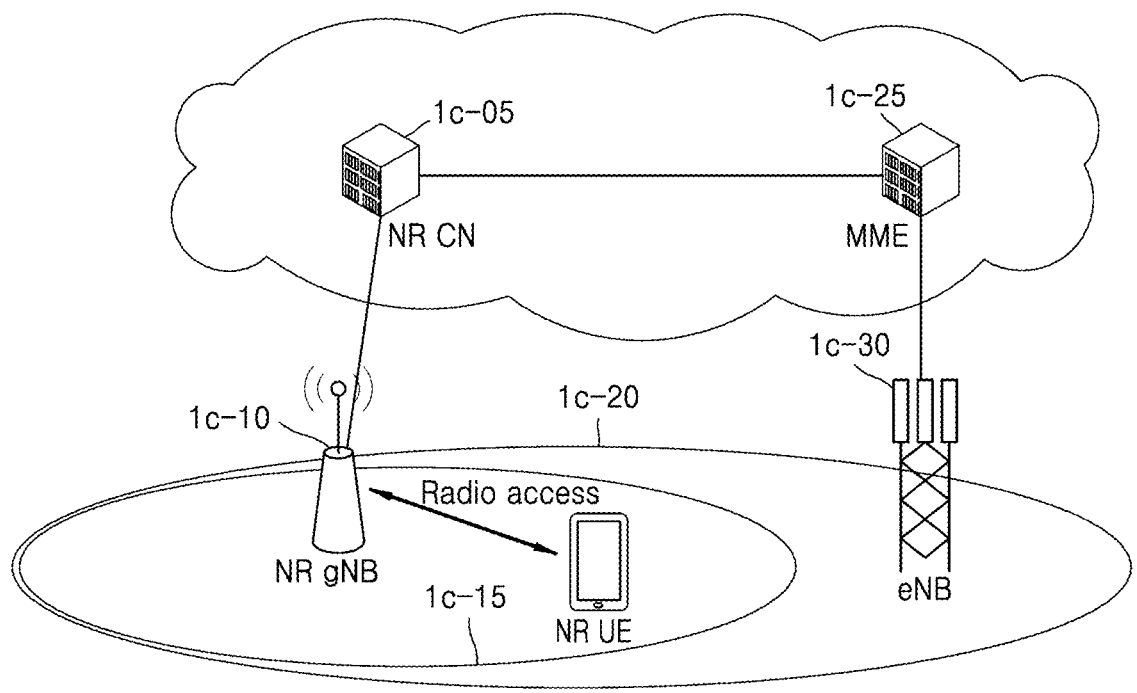
FIG. 1C illustrates a structure of a next-generation mobile communication system according to an embodiment of the disclosure.
Figure 1D:
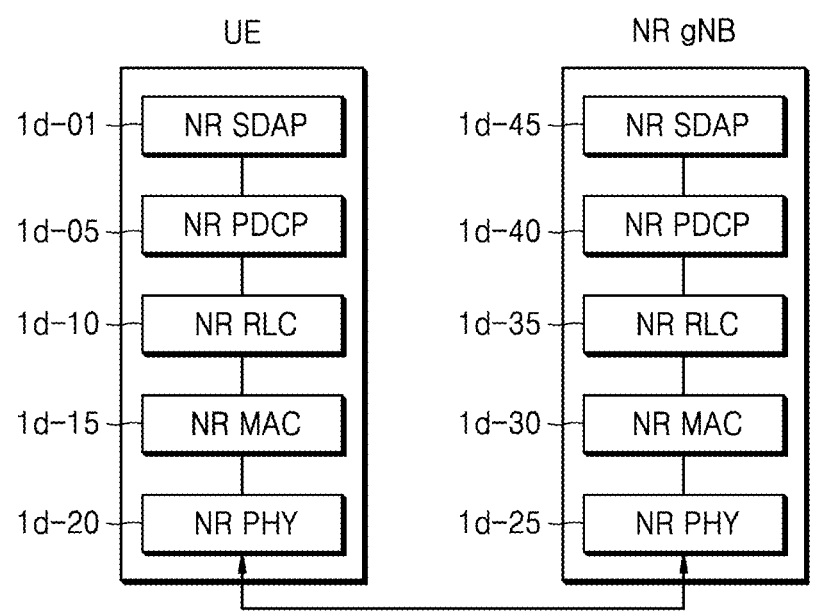
FIG. 1D illustrates a radio protocol architecture of a next-generation mobile communication system according to an embodiment of the disclosure.
Figure 1E:
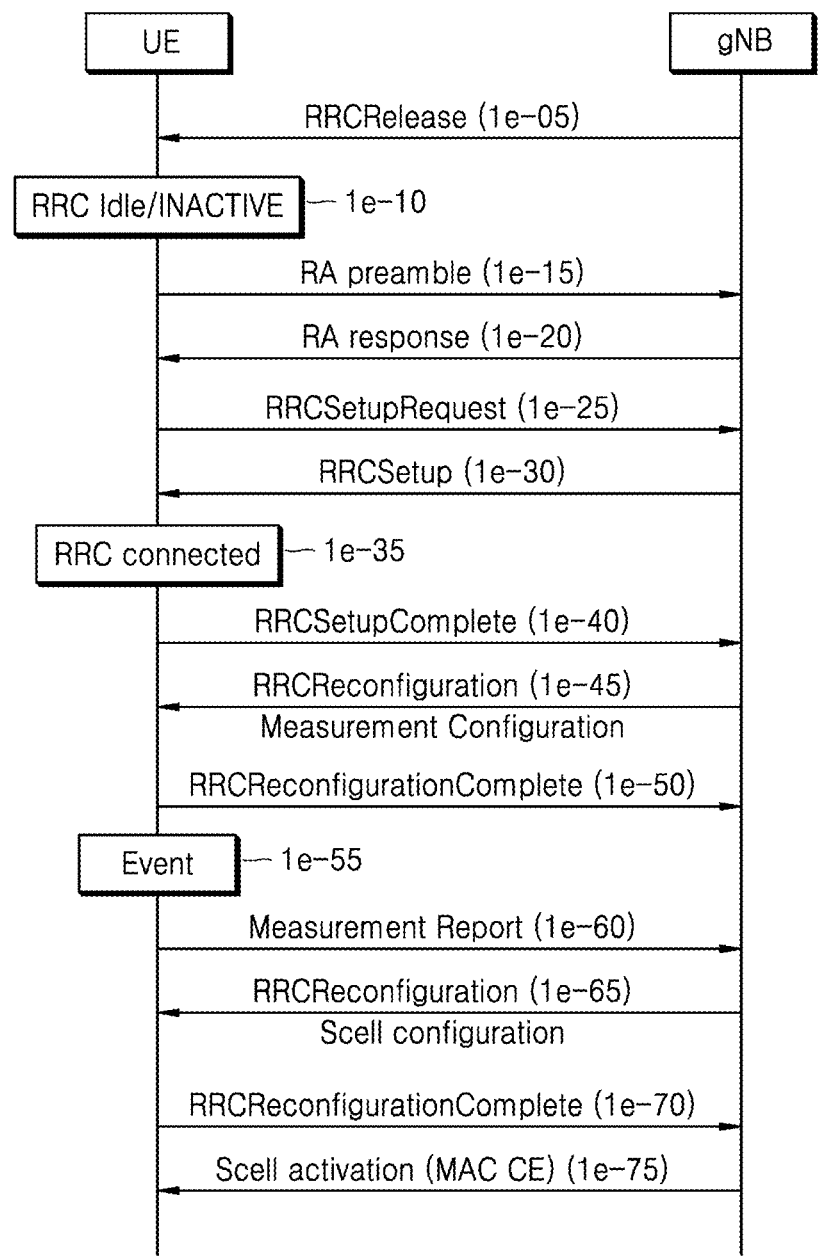
FIG. 1E illustrates a procedure between a UE and a gNB where the UE switches from a radio resource control (RRC) idle mode or an RRC inactive mode to an RRC connected mode and configures carrier aggregation (CA) according to an embodiment of the disclosure.
Figure 1G:
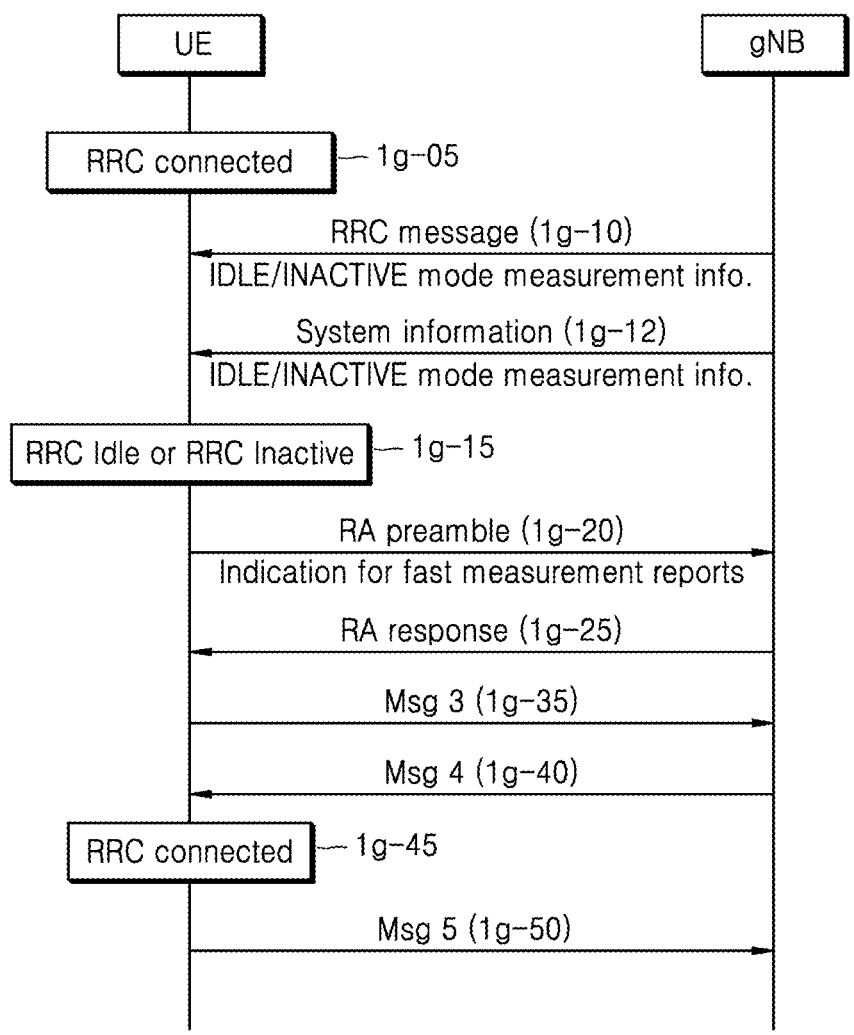
FIG. 1G illustrates a procedure between a UE and a gNB where the UE performs early frequency measurement in the RRC idle mode or the RRC inactive mode and transmit a fast measurement report according to an embodiment of the disclosure.
Figure 1H:
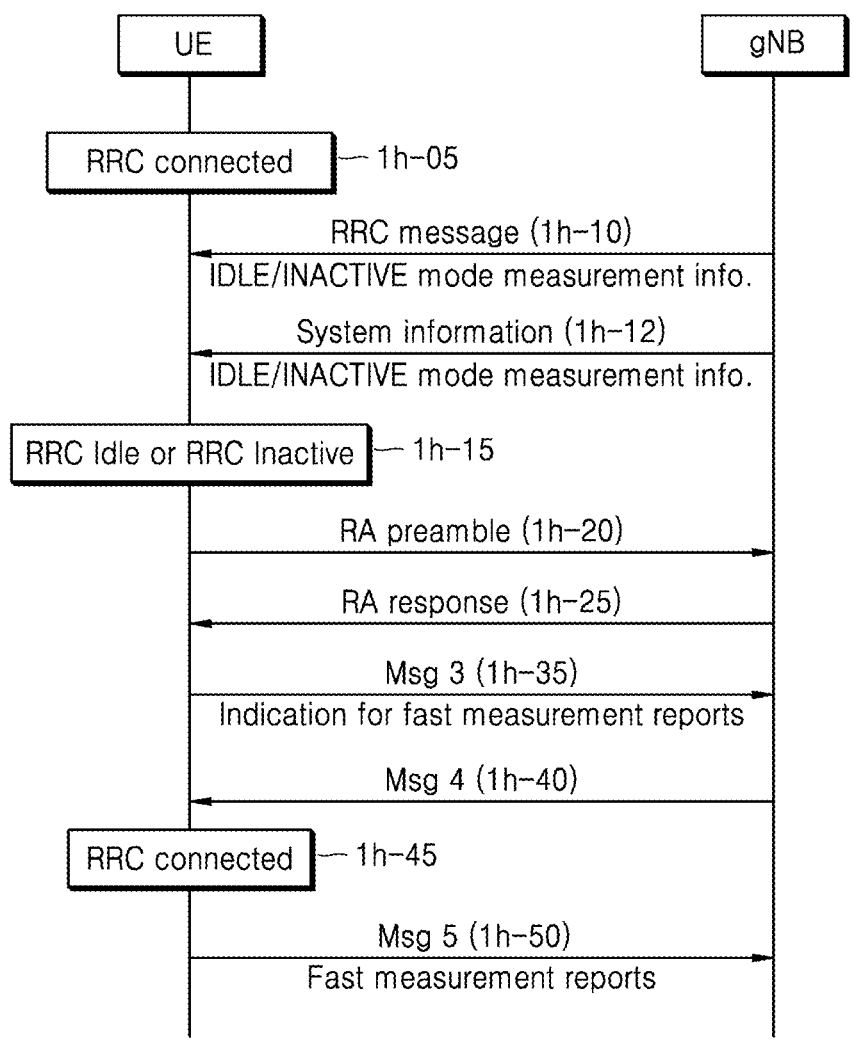
FIG. 1H illustrates another procedure between a UE and a gNB where the UE performs early frequency measurement in the RRC idle mode or the RRC inactive mode and transmit a fast measurement report according to an embodiment of the disclosure.
Figure 1I:
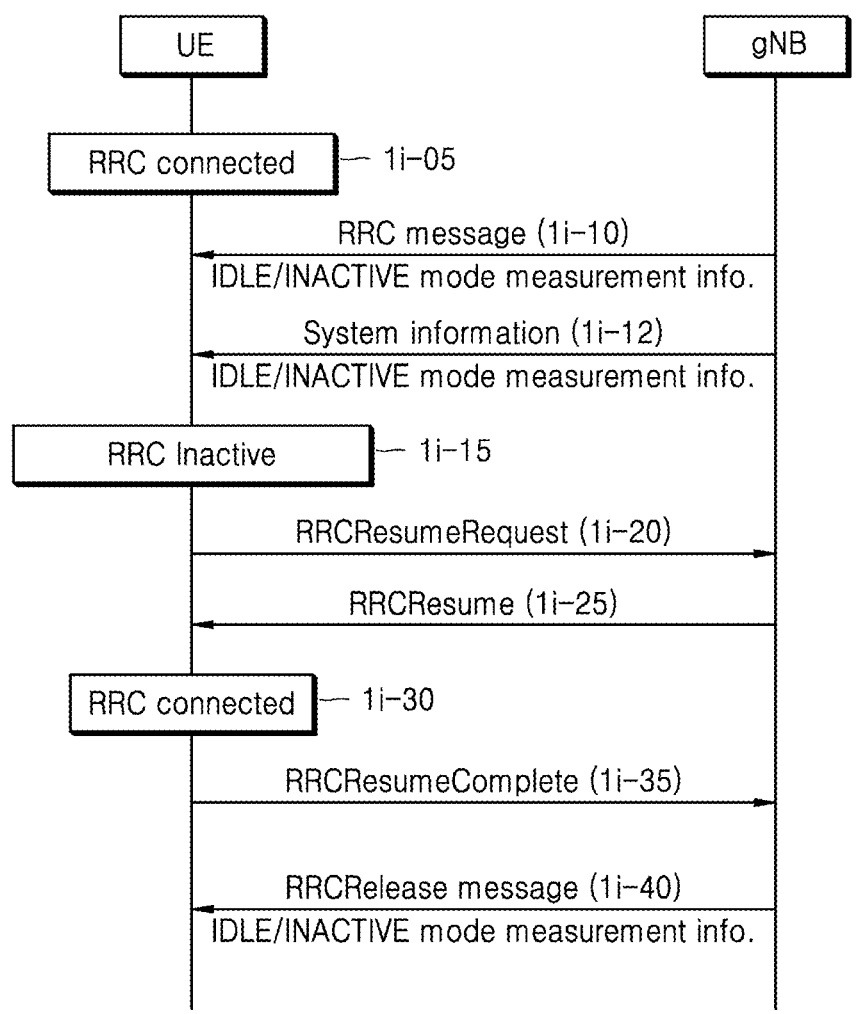
FIG. 1I illustrates a procedure of updating a first radio access network (RAN) notification area according to an embodiment of the disclosure.
Figure 1J:
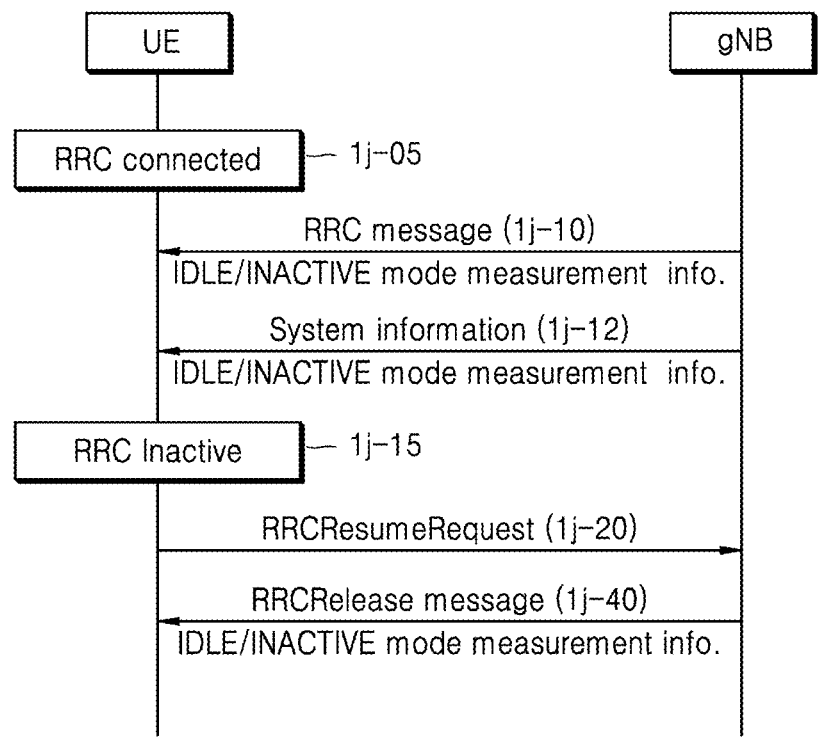
FIG. 1J illustrates a procedure of updating a second RAN notification area according to an embodiment of the disclosure.
Figure 1K:
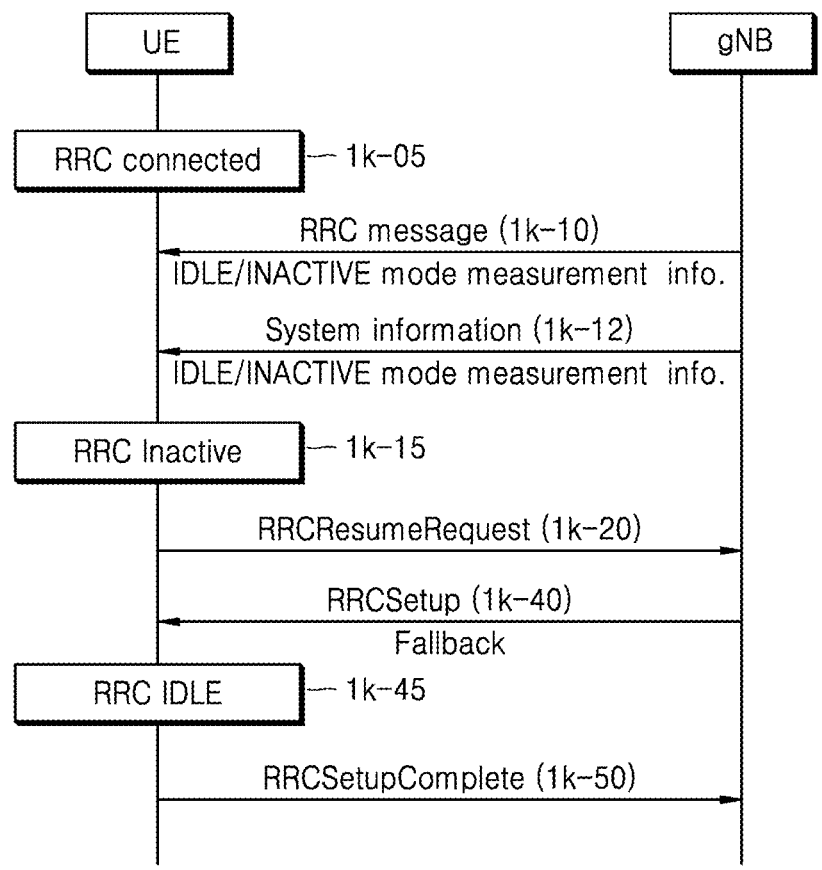
FIG. 1K illustrates a procedure between a UE and a gNB where the UE in the RRC inactive mode falls back to the RRC idle mode due to an indication of a base station while trying to resume a connection with a network according to an embodiment of the disclosure.
Figure 1L:
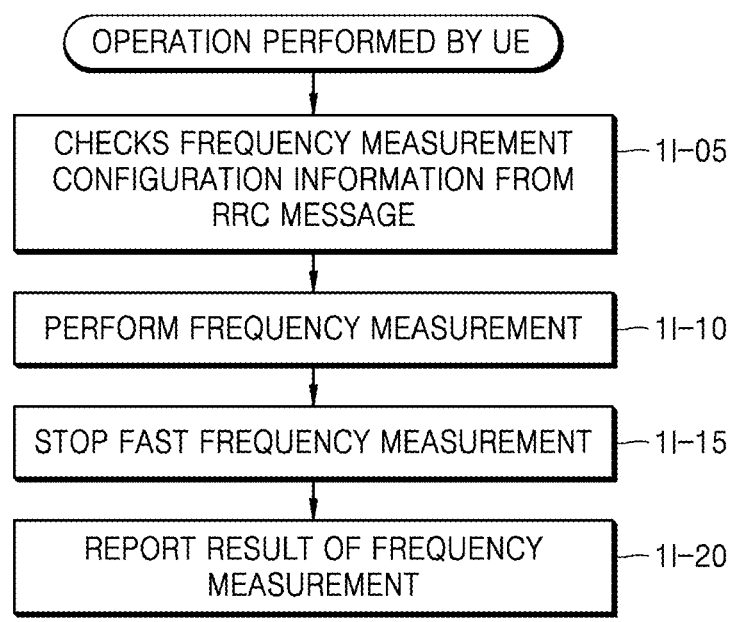
FIG. 1L illustrates a flowchart of an operation, performed by a UE, of performing frequency measurement in the RRC idle mode or the RRC inactive mode perform and transmitting a fast measurement report according to an embodiment of the disclosure.
Figure 1M:
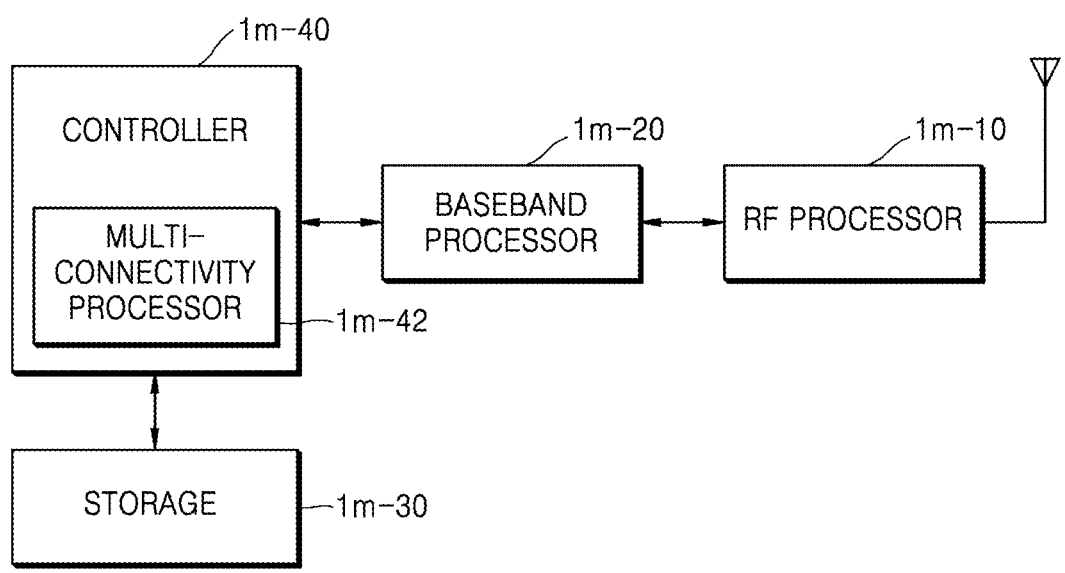
FIG. 1M illustrates a structure of a UE according to an embodiment of the disclosure.
Figure 1N:
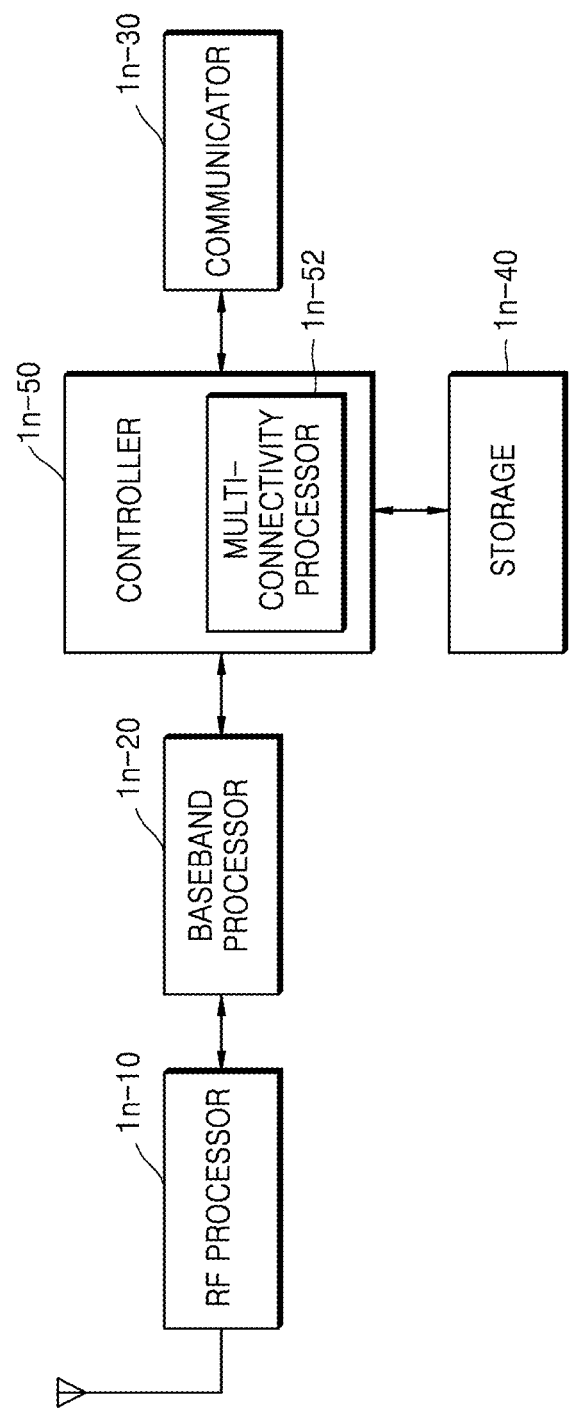
FIG. 1N illustrates a structure of a transmission reception point (TRP) device in a mobile communication system according to an embodiment of the disclosure.

FIGS. 1A through 1N, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described more fully with reference to the accompanying drawings. In the following description of embodiments of the disclosure, descriptions of techniques that are well known in the art and not directly related to the disclosure are omitted. This is to clearly convey the gist of the disclosure by omitting any unnecessary explanation.

For the same reason, some elements in the drawings are exaggerated, omitted, or schematically illustrated. Also, actual sizes of respective elements are not necessarily represented in the drawings. In the drawings, the same or corresponding elements are denoted by the same reference numerals.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals or characters refer to like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, and a multimedia system capable of performing a communication function.

In the disclosure, a controller may also be referred to as a processor.

In the disclosure, a layer (or a layer apparatus) may also be referred to as an entity.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" or "~er(or)" used herein denotes a software element or a hardware element such as a field-programmable gate array (FPGA) or an application-specific integrated circuit (ASIC), and performs a certain function. However, the term "unit" or "~er(or)" is not limited to software or hardware. The term "unit" or "~er(or)" may be configured to be included in an addressable storage medium or to reproduce one or more processors. Thus, the term "unit" or "~er(or)" may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or "~ers(ors)" may be combined into a smaller number of components and "units" or "~ers(ors)" or may be further separated into additional components and "units" or "~ers(ors)." In addition, the components and "units" or "~ers(ors)" may be implemented to operate one or more central processing units (CPUs) in a device or a secure multimedia card. According to an embodiment of the disclosure, the "unit" or "~er(or)" may include one or more processors.

As used in the following description, terms identifying access nodes, terms indicating network entities, terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used.

Hereinafter, for convenience of description, the disclosure uses terms and names defined in the 3rd generation partnership project long term evolution (3GPP LTE) standard. However, the disclosure is not limited to the terms and names but may also be identically applied to systems that comply with other standards. In the disclosure, an eNB may be used interchangeably with a gNB for convenience of explanation. In other words, a base station described as an eNB may also indicate a gNB. The term "terminal" may refer to a mobile phone, NB-IoT devices, sensors, and various other wireless communication devices.

In next-generation mobile communication systems, a base station needs to fast configure carrier aggregation (CA) or dual connectivity (DC) for a terminal, in order to support a service having a high data transmission rate and a low transmission delay. However, the base station needs a measurement report provided by the terminal in order to configure these technologies for the terminal. Thus, a method enabling a base station to receive a fast measurement report provided by the terminal is necessary.

According to an embodiment of the disclosure, in next-generation mobile communication systems, a terminal in a radio resource control (RRC) idle mode or an RRC inactive mode is enabled to transmit a fast measurement report regarding a neighboring frequency to a base station, so that the base station may fast configure CA or DC for the terminal. In more detail, the terminal is enabled to perform frequency measurement based on preconfigured frequency configuration information before configuring a connection with a network, and to immediately transmit a measurement report when the terminal configures a connection with a network, so that a base station may fast configure CA or DC for the terminal.

The disclosure describes a method enabling a terminal in the RRC inactive mode to perform frequency measurement before configuring an RRC connection with a network and to provide a fast measurement report when or after the RRC connection is configured. According to an embodiment of the disclosure, a base station may fast configure CA or DC for a terminal.

Embodiments of the disclosure may be described as follows.

According to the disclosure, when a terminal in an RRC connected mode receives, from a base station, frequency measurement configuration information together with an indication to release an RRC connection and transit to the RRC idle mode or the RRC inactive mode, the terminal may perform frequency measurement in the RRC idle mode or the RRC inactive mode for a duration or time period configured in the frequency measurement configuration information.

However, when the frequency measurement configuration information includes no information about a list of frequencies to be measured, and frequency measurement configuration information for frequency measurement by the terminal in the RRC idle mode or the RRC inactive mode is broadcast by a cell on which the terminal is camped during a cell reselection procedure, the terminal may receive the frequency measurement configuration information and may perform frequency measurement. When an RRC connection with a network needs to be configured, the terminal may indicate that there is a result of frequency measurement performed in the RRC idle mode or the RRC inactive mode, while configuring an RRC connection with the base station.

At this time, the terminal may indicate, through a preamble, the information that there is a result of frequency measurement performed in the RRC idle mode or the RRC inactive mode, when performing a random access. For example, particular preambles may be configured to be used as an indicator in system information. Alternatively, particular preambles may be configured to indicate that many uplink transmission resources are needed. Alternatively, particular preambles may be promised to be used as an indicator. When the base station identifies the indicator, the base station may include, in a random access response, an indicator indicating to transmit a measurement report, and transmit the random access response including the indicator. In another embodiment, because the random access response transmitted by the base station may indicate an instruction to transmit a measurement report, an indicator may be omitted.

When the terminal receives the uplink transmission resources from the random access response, the terminal may transmit and transmit a measurement report together with message 3 (for example, an RRCSetupRequest message or an RRCResumeRequest message). Thereafter, the terminal may perform connection configuration with a network, and, when the base station transmits message 4 (for example, an RRCSetup message or an RRCResume message) to the terminal, the base station may transmit message 4 including CA configuration information or DC configuration information and thus fast resume, or change, or re-configure CA or DC for the terminal.

In another embodiment, an indicator indicating that there is a result of performing frequency measurement performed in the RRC idle mode or the RRC inactive mode may be included in message 3 (for example, an RRCSetupRequest message or an RRCResumeRequest message) that is transmitted after the terminal performs random access, and then transmitted. When the base station transmits message 4 (for example, an RRC Setup message or an RRCResume message) to the terminal, the base station may include, in message 4, an indicator indicating the terminal to transmit a measurement report and transmit message 4 including the indicator. In another embodiment, because message 4 may indicate an instruction to transmit a measurement report, the indicator may be omitted. The terminal may transmit a measurement report through message 5 (for example, an RRCSetupComplete message or an RRCResumeComplete message).

Because the terminal in the RRC inactive mode resumes or activates a security procedure (encryption & decryption or integrity protection and verification) regarding Signaling Radio Bearer1 (SRB1) when transmitting an RRCResumeRequest message, the terminal may reinforce security and receive message 4, and, even when transmitting a measurement report through message 5, the terminal may reinforce security and report a result of frequency measurement. The base station may include CA configuration information or DC configuration information in an RRC message and transmit the RRC message, by using a measurement report. Accordingly, the base station may fast resume, change, or reconfigure CA or DC for the terminal.

The disclosure also describes an efficient signaling method for allowing a network or a base station to more efficiently configure or update frequency measurement configuration information for a terminal that is movable in the RRC inactive mode.

A terminal in the RRC idle mode and a terminal in the RRC inactive mode are greatly different from each other in that the terminal in the RRC inactive mode may configure a fast connection because the base station and the terminal store terminal context and re-use the terminal context when configuring a connection next and that the terminal in the RRC inactive mode periodically updates a radio access network (RAN) notification area and thus update an area needing to maintain the RRC inactive mode from a network.

According to the disclosure, when the terminal in the RRC connected mode receives, from the base station, frequency measurement configuration information together with an indication of releasing an RRC connection and transiting to the RRC inactive mode, the terminal may perform frequency measurement in the RRC inactive mode for a duration or time period configured in the frequency measurement configuration information. When the terminal in the RRC inactive mode deviates from a configured RAN notification area while moving, the terminal configures a connection to the network in order to perform a RAN notification area update (RNAU) procedure.

In one embodiment described in the disclosure, to update the RAN notification area, the base station may configure, update, or partially change new frequency measurement configuration information for the terminal that has performed a connected to the network. The base station may retrieve a terminal context from a source base station through a connection resume identifier indicated by a terminal in message 3 (RRC Resume Request) and may determine whether the terminal is configured to perform frequency measurement in the RRC inactive mode. In another embodiment, when the terminal transmits message 3 to update the RAN notification area, the terminal may include, in message 3 in the form of an indicator, information that frequency measurement has been configured to be performed in the RRC inactive mode or information that a T331 timer has expired or is under operation or new frequency configuration information is necessary, and may transmit message 3 including the information to the base station.

After the base station determines whether the terminal is able to perform frequency measurement in the RRC inactive mode, when the base station transmits, to the terminal, an RRC message (for example, an RRCRelease message) including information that the RAN notification area is updated, the base station may include new frequency measurement configuration information in the RRC message and transmit the RRC message including the new frequency measurement configuration information. The new frequency measurement configuration information may include configuration information such as a frequency list to be measured, a list of physical cell identifiers, a measurement duration, or a validity area on which measurement is to be performed (e.g., a cell identifier list).

According to embodiments of the disclosure, a procedure is described in which, in the case that a base station or cell to which a terminal is connected supports frequency measurement in the RRC idle mode or the RRC inactive mode or system information indicates that frequency measurement is supported, after the terminal transmit a measurement report to the base station, the terminal stops a timer (T331) for frequency measurement in the RRC idle mode or the RRC inactive mode, and discards or release the frequency measurement configuration information or discard the result of frequency measurement.

The disclosure describes that the terminal in the RRC inactive mode or the RRC idle mode configures a certain area to perform frequency measurement (for example, a validity area). In other words, the terminal performs frequency measurement in the RRC inactive mode or the RRC idle mode only within the validity area, and, when being out of the validity area, the terminal may stop the timer, release the frequency measurement configuration information, discard the result of frequency measurement, or stop frequency measurement.

The validity area may be indicated as, for example, a list of physical cell identifiers or a list of RAN notification area indicators. The disclosure describes one embodiment of separately configuring a validity area and a RAN notification area for the terminal in the RRC inactive mode, and one embodiment for reducing the burden of the terminal and signaling overhead by enabling the terminal in the RRC inactive mode to replace the RAN notification area with the validity area or vice versa (i.e., to replace the validity area with the RAN notification area). When a certain validity area is indicated to a terminal, to realize the terminal, a tracking area needs to be maintained and updated, the RAN notification area also needs to be maintained and updated, and the validity area also needs to be maintained and updated, thereby increasing overhead.

According to the disclosure, a certain timer may be set according to a frequency configuration group or radio access technology that is used when the frequency measurement configuration information is indicated to the terminal in the RRC inactive mode or the RRC idle mode, or for each frequency, for each cell, or for each beam. In other words, a time period or timer value indicating how long frequency measurement is to be performed on a Long Term Evolution (LTE) frequency (for each frequency or for each cell) may be set, and a time period or timer value indicating how long frequency measurement is to be performed on a new radio (NR) frequency (for each frequency, for each cell, or for each beam) may be set, so that a certain timer may be set for each frequency configuration group and thus a certain time period may be set.

FIG. 1A illustrates a structure of an LTE system according to an embodiment of the disclosure.

Referring to FIG. 1A, a radio access network (RAN) of the LTE system includes evolved node Bs (hereinafter, referred to as ENBs, node Bs (NB s) or base stations) 1a-05, 1a-10, 1a-15, and 1a-20, a mobility management entity (MME) 1a-25, and a serving-gateway (S-GW) 1a-30. A user equipment (UE) 1a-35 (also referred to as a terminal) may access an external network via the ENB 1a-05, 1a-10, 1a-15, or 1a-20 and the S-GW 1a-30.

In FIG. 1A, the ENB 1a-05, 1a-10, 1a-15, or 1a-20 may correspond to an NB of a universal mobile telecommunication system (UMTS). The ENB 1a-05, 1a-10, 1a-15, or 1a-20 is connected to the UE 1a-35 through a radio channel and performs complex functions compared to the NB. In the LTE system, because all user traffic including a real-time service such as voice over internet protocol (VoIP) is provided via a shared channel, an entity that schedules UEs 1a-35 by gathering state information such as buffer states, available transmit power states, and channel states of the UEs 1a-35 may be necessary, and the ENB 1a-05, 1a-10, 1a-15, or 1a-20 may operate as the entity. A single ENB may generally control multiple cells.

For example, the LTE system may use radio access technology such as an orthogonal frequency division multiplexing (OFDM) at a bandwidth of 20 MHz to achieve a data rate of 100 Mbps. Also, the ENB 1a-05, 1a-10, 1a-15, or 1a-20 may use an adaptive modulation & coding (AMC) scheme to determine a modulation scheme and a channel coding rate in accordance with a channel state of the UE 1a-35. The S-GW 1a-30 is an entity for providing data bearers and may configure or release the data bearers under the control of the MME 1a-25. The MME 1a-25 is an entity for performing a mobility management function and various control functions for the UE 1a-35 and may be connected to the ENBs 1a-05, 1a-10, 1a-15, and 1a-20.

FIG. 1B illustrates a radio protocol architecture in an LTE system according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an ENB. The PDCP layer 1b-05 or 1b-40 is in charge of IP header compression/decompression, etc. Main functions of the PDCP layer 1b-05 or 1b-40 may be summarized as below: header compression and decompression: robust header compression (ROHC) only; transfer of user data; in-sequence delivery of upper layer PDUs at PDCP re-establishment procedure for RLC acknowledged mode (AM); for split bearers in DC (only support for RLC AM): PDCP PDU routing for transmission and PDCP PDU reordering for reception; duplicate detection of lower layer SDUs at PDCP re-establishment procedure for RLC AM; retransmission of PDCP SDUs at handover and, for split bearers in DC, of PDCP PDUs at PDCP data-recovery procedure, for RLC AM; ciphering and deciphering; and timer-based SDU discard in uplink.

The RLC layer 1b-10 or 1b-35 may perform, for example, an automatic repeat request (ARQ) operation by reconfiguring PDCP packet data units (PDUs) to appropriate sizes. Main functions of the RLC layer 1b-10 or 1b-35 may be summarized as below: transfer of upper layer PDUs; error correction through ARQ (only for AM data transfer); concatenation, segmentation and reassembly of RLC SDUs (only for UM and AM data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment.

The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer 1b-15 or 1b-30 may be summarized as below: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by means of dynamic scheduling; MBMS service identification; transport format selection; and padding;

A physical (PHY) layer 1b-20 or 1b-25 may channel-code and modulate upper layer data into OFDM symbols and transmit the OFDM symbols through a radio channel, or demodulate OFDM symbols received through a radio channel and channel-decode and deliver the OFDM symbols to an upper layer.

FIG. 1C illustrates a structure of a next-generation mobile communication system according to an embodiment of the disclosure.

Referring to FIG. 1C, a RAN of the next-generation mobile communication system (e.g., a new radio (NR) or 5G system) may include a new radio node B (hereinafter, referred to as a NR gNB or an NR base station) 1c-10 and a new radio core network (NR CN) 1c-05. A new radio user equipment (NR UE) or UE 1c-15 may access an external network via the NR gNB 1c-10 and the NR CN 1c-05.

In FIG. 1C, the NR gNB 1c-10 may correspond to an eNB of an existing LTE system. The NR gNB 1c-10 is connected to the NR UE 1c-15 through radio channels and may provide superior services compared to an NB. In the next-generation mobile communication system, because all user traffic is provided via a shared channel, an entity that schedules UEs 1a-35 by gathering state information such as buffer states, available transmit power states, and channel states of UEs may be necessary, and the NR gNB 1c-10 may operate as the entity. A single NR gNB 1c-10 generally control multiple cells. The NR system may have a bandwidth greater than an existing maximum bandwidth to achieve an ultrahigh data rate, compared to a current LTE system, and OFDM may be used as radio access technology, and beamforming technology may be additionally used. Also, the NR system may use an AMC scheme to determine a modulation scheme and a channel coding rate in accordance with a channel state of the NR UE 1c-15.

The NR CN 1c-05 may perform functions such as mobility support, bearer setup, and quality of service (QoS) setup. The NR CN 1c-05 is an entity for performing a mobility management function and various control functions for the NR UE 1c-15 may be connected to multiple base stations. The next-generation mobile communication system may cooperate with the existing LTE system, and the NR CN 1c-05 may be connected to an MME 1c-25 through a network interface. The MME 1c-25 may be connected to an eNB 1c-30 being an existing base station.

FIG. 1D illustrates a radio protocol architecture of a next-generation mobile communication system according to an embodiment of the disclosure.

Referring to FIG. 1D, the radio protocol architecture of the next-generation mobile communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB. Main functions of the NR SDAP layer 1d-01 or 1d-45 may include some of the following functions: transfer of user plane data; mapping between a QoS flow and a DRB for both DL and UL; marking QoS flow ID in both DL and UL packets; and reflective QoS flow to DRB mapping for the UL SDAP PDUs.

With respect to the above-described SDAP layer, the UE may be configured, via an RRC message, whether to use a header of the SDAP layer or use a function of the SDAP layer for each PDCP layer, each bearer, or each logical channel. When an SDAP header is configured, a non-access stratum (NAS) reflective QoS 1-bit indicator and an access stratum (AS) reflective QoS 1-bit indicator of the SDAP header may indicate that the UE updates or reconfigures mapping information regarding the data bearer and the QoS flow of uplink (UL) and downlink (DL). The above-described SDAP header may include QoS flow ID indicating QoS. The above-described QoS information may be used as data processing priority information, scheduling information, etc. for supporting a smooth service.

Main functions of the NR PDCP layer 1d-05 or 1d-40 may include some of the following functions: header compression and decompression: ROHC only; transfer of user data; in-sequence delivery of upper layer PDUs; out-of-sequence delivery of upper layer PDUs; PDCP PDU reordering for reception; duplicate detection of lower layer SDUs; retransmission of PDCP SDUs; ciphering and deciphering; and timer-based SDU discard in uplink A reordering function of the NR PDCP layer 1d-05 or 1d-40 may include a function of reordering PDCP PDUs received from a lower layer, based on a PDCP sequence number (SN), and a function of delivering the reordered data to an upper layer in order. Alternatively, the reordering function of the NR PDCP layer 1d-05 or 1d-40 may include at least one of a function of immediately delivering the reordered data without considering an order, a function of recording missing PDCP PDUs by reordering the PDCP PDUs, a function of reporting a status of the missing PDCP PDUs to a transmitter, or a function of requesting to retransmit the missing PDCP PDUs.

Main functions of the NR RLC layer 1d-10 or 1d-35 may include some of the following functions: transfer of upper layer PDUs; in-sequence delivery of upper layer PDUs; out-of-sequence delivery of upper layer PDUs; error correction through ARQ; concatenation, segmentation and reassembly of RLC SDUs; re-segmentation of RLC data PDUs; reordering of RLC data PDUs; duplicate detection; protocol error detection; RLC SDU discard; and RLC re-establishment;

In-sequence delivery of the NR RLC layer 1d-10 or 1d-35 means a function of delivering RLC SDUs received from a lower layer, to an upper layer in order. When a single RLC SDU is segmented into multiple RLC SDUs and received, the in-sequence delivery of the NR RLC layer 1d-10 or 1d-35 may include a function of reassembling the multiple RLC SDUs and delivering the RLC SDUs, a function of reordering received RLC PDUs on an RLC SN or PDCP SN basis, a function of recording missing RLC PDUs by reordering the RLC PDUs, a function of reporting a status of the missing RLC PDUs to a transmitter, a function of requesting to retransmit the missing RLC PDUs, a function of delivering only RLC SDUs previous to a missing RLC SDU, to the upper layer in order, when the missing RLC SDU exists, a function of delivering all RLC SDUs received before a timer is started, to the upper layer in order, when a certain timer is expired although a missing RLC SDU exists, or a function of delivering all RLC SDUs received up to a current time, to the upper layer in order, when a certain timer is expired although a missing RLC SDU exists.

In out-of-sequence delivery of the NR RLC layer 1d-10 or 1d-35, the NR RLC layer 1d-10 or 1d-35 may process the RLC PDUs in order of reception regardless of sequence numbers and deliver the RLC PDUs to the NR PDCP layer 1d-05 or 1d-40 (out-of sequence delivery), and, when the NR RLC layer 1d-10 or 1d-35 receives segments, the NR RLC layer 1d-10 or 1d-35 may receive the segments that are stored in a buffer or are to be received at a later time, reconfigure the received segments into a whole RLC PDU, and then process and deliver the whole RLC PDU to the NR PDCP layer 1*d*-05 or 1*d*-40. The NR RLC layer 1*d*-10 or 1*d*-35 may not include a concatenation function, and the concatenation function may be performed by the NR MAC layer 1*d*-15 or 1*d*-30 or be replaced with a multiplexing function of the NR MAC layer 1*d*-15 or 1*d*-30.

Out-of-sequence delivery of the NR RLC layer 1*d*-10 or 1*d*-35 may include a function of delivering RLC SDUs received from a lower layer, immediately to an upper layer out of an order. The out-of-sequence delivery of the NR RLC layer 1*d*-10 or 1*d*-35 may include at least one of a function of, when a single RLC SDU is segmented into multiple RLC SDUs and received, reassembling and delivering the multiple RLC SDUs, or a function of storing RLC SNs or PDCP SNs of received RLC PDUs and recording missing RLC PDUs by ordering the RLC PDUs.

The NR MAC layer 1*d*-15 or 1*d*-30 may be connected to multiple NR RLC layers 1*d*-10 or 1*d*-35 configured for a single UE, and main functions of the NR MAC layer 1*d*-15 or 1*d*-30 may include some of the following functions: mapping between logical channels and transport channels; multiplexing/demultiplexing of MAC SDUs; scheduling information reporting; error correction through HARQ; priority handling between logical channels of one UE; priority handling between UEs by means of dynamic scheduling; MBMS service identification; transport format selection; and padding.

A PHY layer 1*d*-20 or 1*d*-25 may channel-code and modulate upper layer data into OFDM symbols and transmit the OFDM symbols through a radio channel, or demodulate OFDM symbols received through a radio channel and channel-decode and deliver the OFDM symbols to an upper layer.

In the next-generation mobile communication system, the UE may perform frequency measurement while performing a cell reselection procedure in the RRC idle mode. The frequency measurement that is performed while performing a cell reselection procedure may mean intra-frequency measurement or serving cell or Pcell measurement with respect to frequencies configured or broadcast by a camped-on cell. However, the UE does not perform inter-frequency measurement other than intra-frequency measurement or serving cell or Pcell measurement and does not separately transmit a measurement report to a network.

In other words, when the UE first searches for a suitable cell via a cell reselection procedure and camps on a found suitable cell and then transits to the RRC connected mode via an RRC connection configuration procedure, the base station may configure, for the UE in the RRC connected mode, what frequencies (e.g., a frequency list) or what frequency bands are to be measured, in what order prioritized frequencies are to be measured, what beams are to be measured, what filtering schemes (e.g., L1 filtering, L2 filtering, L3 filtering, or what coefficient and what calculation schemes are used to measure a frequency) is used to measure the intensity of a frequency during frequency measurement, according to what event or condition frequency measurement is to start, based on what criterion a frequency is to be measured as compared with a current serving cell (or a frequency currently being camped on), according to what event or condition is a measurement report to be transmitted, what criterion or condition needs to be satisfied to report a frequency as compared with the current serving cell (or the frequency currently being camped on), and at what intervals is a measurement report to be transmitted. The UE measures corresponding frequencies according to the frequency configuration configured by the base station, and transmit a measurement report according to corresponding events or conditions. The base station may determine whether to apply CA or DC to the UE by using the measurement report received from the UE.

The disclosure describes one embodiment in which the UE of the next-generation mobile communication system performs frequency measurement in the RRC idle mode or the RRC inactive mode, which is a mode before the UE transits to the RRC connected mode, and indicates that there is a measurement report to the base station when the UE configures a connection with a network, and enters the RRC connected mode to transmit a fast measurement report. According to this embodiment, the base station may fast configure CA or DC for the UE, based on the measurement report performed in the RRC idle mode or the RRC inactive mode.

In detail, when the base station allows the UE in the RRC connected mode having configured a connection to a network to transit to the RRC idle mode or the RRC inactive mode, the base station may configure, through an RRC message, information about frequencies the UE is to measure in the RRC idle mode or the RRC inactive mode, or information about a time period (or a duration) during which the UE is to measure frequencies in the RRC idle mode or the RRC inactive mode, or area information (or a cell list) about an area where the UE is to measure frequencies in the RRC idle mode or the RRC inactive mode, and may indicate the UE to perform frequency measurement in the RRC idle mode or the RRC inactive mode.

Moreover, the UE may read out system information of a newly-camped-on cell while performing a cell reselection operation whenever moving, and may perform, according to the system information, a procedure such as whether to continue or terminate frequency measurement in the RRC idle mode or the RRC inactive mode, whether to extend a measurement duration (e.g., a timer restarts), whether to report measurement report, or whether to discard a measurement report. In the disclosure, an efficient UE operation is described in association with this procedure.

In the disclosure, a bearer may include an SRB and a DRB, wherein the SRB means a signaling radio bearer and the DRB means a data radio bearer. An unacknowledged mode (UM) DRB means a DRB that uses an RLC layer operating in the UM, and an acknowledged mode (AM) DRB means a DRB that uses an RLC layer operating in the AM.

FIG. 1E illustrates a procedure between a UE and an gNB where the UE switches from the RRC idle mode or the RRC inactive mode to the RRC connected mode and configures CA according to an embodiment of the disclosure.

In FIG. 1E, a base station may allow the UE in the RRC connected mode having configured a connection with a network to transit to the RRC idle mode or the RRC inactive mode for a certain reason. The certain reason may include, for example, deficiency of scheduling resources of the base station or stoppage of data transmission and reception with the UE for a certain time period.

The base station may indicate the UE to transit to the RRC idle mode or the RRC inactive mode, by transmitting an RRC Release message to the UE. The base station may indicate the UE to transit to the RRC inactive mode, by using an indicator (suspend-config) included in the RRC Release message. In more detail, when the RRC Release message does not include the indicator (suspend-config), the UE may transit to the RRC idle mode (operation 1*e*-05).

When the UE that has transited to the RRC idle mode or the RRC inactive mode needs a connection to a network for a certain reason, the UE may perform a random access procedure, receive a random access response, request RRC connection configuration, and receive an RRC message to perform RRC connection configuration (operations 1e-10, 1e-15, 1e-20, 1e-25, 1e-30, 1e-35, and 1e-40).

The UE establishes an inverse direction transmission synchronization via a random access process and transmits an RRCSetupRequest message to the base station (operation 1e-25). The RRCSetupRequest message may include, for example, an establishment cause for configuring a connection with an identifier of the UE.

The base station transmits an RRC Setup message to the UE so that the UE configures up an RCC connection (operation 1e-30). The RRCSetup message may include at least one of configuration information for each logical channel, configuration information for each bearer, configuration information of a PDCP layer, configuration information of an RLC layer, or configuration information of a MAC layer.

The RRCSetup message may allocate a bearer identifier (e.g., an SRB identifier or a DRB identifier) to each bearer, and may indicate configuration of the PDCP layer, the RLC layer, the MAC layer, and a PHY layer for each bearer. The RRCSetup message may configure a length (e.g., 12 bits or 18 bits) of a PDCP SN that is used in the PDCP layer and may configure a length (e.g., 12 bits or 18 bits) of an RLC SN that is used in the RLC layer, for each bearer. The RRCSetup message may indicate whether to use a header compression and decompression protocol in an uplink or a downlink with respect to the PDCP layer for each bearer and may indicate whether to perform an integrity protection or verification procedure. The RRCSetup message may also indicate whether to perform an out-of-order delivery in the PDCP layer.

The UE that has configured RRC connection transmits an RRCSetupComplete message to the base station (operation 1e-40). The RRCSetupComplete message may include a control message such as a SERVICE REQUEST message indicating that the UE requests an access mobility management function (AMF) or a mobility management entity (MME) for bearer configuration for a certain service. The base station may transmit the SERVICE REQUEST message included in the RRCSetupComplete message to the AMF or the MME, and the AMF or the MME may determine whether to provide the service requested by the UE.

When the base station determines to provide the service requested by the UE, the AMF or the MME transmits an INITIAL CONTEXT SETUP REQUEST message to the base station. The INITIAL CONTEXT SETUP REQUEST message may include, for example, QoS information that is to be applied during DRB configuration, and security-related information (e.g., a security key and a security algorithm) that is to be applied to the DRB.

The base station transmits and receives a SecurityModeCommand message and a SecurityModeComplete message to and from the UE to configure security, and, when security configuration is completed, transmits an RRCReconfiguration message to the UE (operation 1e-45).

The RRCReconfiguration message may allocate a bearer identifier (e.g., an SRB identifier or a DRB identifier) to each bearer, and may indicate configuration of the PDCP layer, the RLC layer, the MAC layer, and the PHY layer for each bearer. The RRCReconfiguration message may configure a length (e.g., 12 bits or 18 bits) of a PDCP SN that is used in the PDCP layer and may configure a length (e.g., 12 bits or 18 bits) of an RLC SN that is used in the RLC layer, for each bearer. The RRCReconfiguration message may indicate whether to use a header compression and decompression protocol in an uplink or a downlink for the PDCP layer for each bearer and may indicate whether to perform an integrity protection or verification procedure. The RRCReconfiguration message may also indicate whether to perform an out-of-order delivery in the PDCP layer.

The RRCReconfiguration message may include configuration information of a DRB to process user data, and the UE configures a DRB by applying the configuration information and transmits an RRCReconfigurationComplete message to the base station (operation 1e-50). The base station that has completed DRB configuration with the UE may transmit an INITIAL CONTEXT SETUP COMPLETE message to the AMF or the MME and complete a connection (operation 1e-50).

When all of these processes are completed, the UE transmits or receives data to or from the base station via a core network (operations 1e-55 and 1e-60). According to an embodiment, a data transmission process may roughly include three operations such as RRC setup, security setup, and DRB configuration. The base station may transmit an RRCReconfiguration message to the UE in order to renew, add, or change setup for a certain reason (operation 1e-65).

The RRCReconfiguration message may configure configuration information of frequencies that are to be measured by the UE (e.g., a list of frequencies that are to be measured, a frequency-measurement duration, a frequency-measurement condition, a condition to transmit a measurement report, and a cell identifier that is to transmit a measurement report).

The UE may perform frequency measurement according to frequency measurement configuration information, and, when a certain condition is satisfied (e.g., when a signal intensity of a certain frequency is greater than a certain reference (e.g., a threshold value) or when the intensity of a signal of a current serving cell (frequency) is less than a certain reference (e.g., a threshold value)), the UE may transmit a measurement report to the base station (operation 1e-60).

In response to the transmit a measurement report, the base station may transmit the RRCReconfiguration message based on the measurement report (operation 1e-65). The base station may configure an additional Scell and configure CA for the UE, by including Scell configuration information in the RRCReconfiguration message and transmitting the RRCReconfiguration message including the Scell configuration information for the UE, and may configure DC for the UE by including secondary cell group configuration information in the RRCReconfiguration message and transmitting the RRCReconfiguration message including the secondary cell group configuration information to the UE.

When the base station configures CA for the UE, the base station may allow Scells configured by using a MAC control element (MAC CE) to transit to an activated, inactive, or dormant state.

The procedure in which the base station configures CA or DC for the UE may be summarized as follows. First, when the UE configures up a connection with the base station, and the base station configures the frequency measurement configuration information for the UE in the RRC connected mode, the UE performs frequency measurement, based on the frequency measurement configuration information, and transmits a measurement report to the base station. The base station may configure configuration information of the additional Scell as an RRC message in order to configure CA for the UE, based on the measurement report performed by the UE, and may make Scells be activated, dormant, or inactive by using the MAC CE. The base station may configure additional secondary cell group configuration information in order to configure DC for the UE, based on the transmit a measurement report performed by the UE.

As described above, when the base station configures CA or DC for the UE, the UE first needs to enter the RRC connected mode to receive frequency configuration information, perform frequency measurement, and transmit a measurement report. Accordingly, transmitting a measurement report may be performed very late, and consequently, CA or DC may be configured late. To address this problem, according to an embodiment of the disclosure, the UE is enabled to efficiently perform frequency measurement in the RRC idle mode or the RRC inactive mode, and immediately transmit a measurement report when a connection with a network is configured.

FIG. 1F illustrates a procedure between a UE and a gNB where the UE performs early frequency measurement in the RRC idle mode or the RRC inactive mode and transmit a fast measurement report according to an embodiment of the disclosure.

In the first embodiment, when the base station configures, for the UE, frequency measurement configuration information of frequencies that are to be measured by the UE in the RRC idle mode or the RRC inactive mode, through an RRCRelease message, the base station may configure a plurality of frequency measurement groups, and may configure the UE to perform frequency measurement in the RRC idle mode or the RRC inactive mode.

The disclosure describes one embodiment of configuring a certain frequency measurement list or a certain timer according to a frequency configuration group or radio access technology (or for each cell or for each beam) that is used when the frequency measurement configuration information is indicated for a UE in the RRC inactive mode or the RRC idle mode. In other words, a time period or timer value indicating how long frequency measurement is to be performed with respect to an LTE frequency (for each frequency or for each cell) may be configured.

A time period or timer value indicating how long frequency measurement is to be performed with respect to an NR frequency (for each frequency, for each cell, or for each beam) may also be configured. Accordingly, the disclosure describes one embodiment of configuring a certain timer for each frequency configuration group to set a certain time period. In other words, frequency measurement may be performed until a certain timer is driven for each frequency group and expires. When a certain timer is configured for each wireless access technology, for each cell, or for each beam, different frequency measurement durations may be configured by reflecting frequency characteristics, beam characteristics, or cell characteristics, and consequently battery consumption of a UE may be optimal.

According to the first embodiment, the UE capable of performing frequency measurement in the RRC idle mode or the RRC inactive mode and transmitting a fast measurement report may be a UE corresponding to one case or multiple cases from among the following cases.

In one example, all UEs capable of supporting fast frequency measurement and fast measurement report in the RRC idle mode or the RRC inactive mode.

In one example, a UE having received configuration information indicating the UE to measure a frequency in the RRC idle mode or the RRC inactive mode when the base station makes the UE transit from the RRC connected mode to the RRC idle mode or the RRC inactive mode, through an RRC message, from among the UE in the RRC idle mode or the UE in the RRC inactive mode. For example, a UE having received frequency configuration information of frequencies that are to be measured in the RRC idle mode or the RRC inactive mode or area configuration information (e.g., a list of cell identifiers) of an area to perform frequency measurement Referring to FIG. 1F, the UE in the RRC connected mode (operation 1f-05) may be made transit to the RRC idle mode or the RRC inactive mode by the base station for a certain reason (e.g., because there is no transmission or reception of data for a certain time period) (operation 1f-15). When the base station makes the mode of the UE transit, the base station transmits an RRC message (operation 1f-10). For example, an RRCRelease message (indicating transition to the RRC idle mode) or an RRCRelease message including suspend-config (indicating transition to the RRC inactive mode) may be transmitted. The RRC message may include a plurality of pieces of information below to be applied when the UE performs early frequency measurement in the RRC idle mode or the RRC inactive mode, or some of the plurality of pieces of information.

In one embodiment, for frequency configuration information of frequencies that are measured in the RRC idle mode or the RRC inactive mode, the frequency configuration information includes LTE frequency measurement information group or list (EUTRA frequency configuration information/list/group): the base station may include, in the RRC message, and configure what frequencies (e.g., a frequency list) or what frequency bands are to be measured, in what order prioritized frequencies are to be measured, what filtering schemes (e.g., L1 filtering, L2 filtering, L3 filtering, or what coefficient and what calculation schemes are used to measure a frequency) is used to measure the intensity of a frequency during frequency measurement, according to what event or condition frequency measurement is to start, based on what criterion (e.g., when the intensity of a signal is equal to or greater than an indicated threshold value) is a frequency to be measured and a measurement report to be transmitted as compared with a current serving cell (or a frequency currently being camped on), according to what event or condition is transmit a measurement report to be transmitted, what criterion or condition needs to be satisfied to report a frequency as compared with the current serving cell (or the frequency currently being camped on), and at what intervals is a measurement report to be transmitted.

In such embodiment, the frequency configuration information includes NR frequency measurement information group or list (NR frequency configuration information/list/group): the base station may include, in the RRC message, and configure what frequencies (e.g., a frequency list) or what frequency bands are to be measured, in what order prioritized SSB identifier pieces of information or SSB transmission resources (frequency and time resources, beam identifiers, or beam indicators) of each frequency or prioritized frequencies (or SSBs) are to be measured, what filtering schemes (e.g., L1 filtering, L2 filtering, L3 filtering, or what coefficient and what calculation schemes are used to measure a frequency) is used to measure the intensity of a frequency during frequency measurement, according to what event or condition frequency measurement is to start, based on what criterion (e.g., when the intensity of a signal is equal to or greater than an indicated threshold value) is a frequency to be measured and a measurement report to be transmitted as compared with a current serving cell (or a frequency currently being camped on), according to what event or condition is a measurement report to be transmitted, what criterion or condition needs to be satisfied to report a frequency as compared with the current serving cell (or the frequency currently being camped on), and at what intervals is a measurement report to be transmitted.

In such embodiment, the base station may configure a duration to perform frequency measurement in the RRC idle mode or the RRC inactive mode or a timer value (e.g., T331) to perform frequency measurement, or may separately configure a timer for LTE frequencies and a timer for NR frequencies. Because LTE frequency characteristics (low frequency band) and NR frequency characteristics (high frequency band) are different from each other, a frequency measurement time of the UE may be adjusted separately to thereby save the battery of the UE. For example, when the RRCRelease message indicates frequency measurement in the RRC idle mode or the RRC inactive mode, the UE may start a timer and perform frequency measurement while the timer is operating, and may stop the frequency measurement when the timer is terminated.

In such embodiment, when the base station indicates validity area information of a validity area on which frequency measurement is to be performed in the RRC idle mode or the RRC inactive mode, for example, a list of physical cell identifiers (PCIDs), and the UE is within a cell indicated by the validity area information, the UE may perform frequency measurement. On the other hand, when the UE deviates from an area indicated by the validity area information, the UE may stop the frequency measurement. For example, when the UE deviates from the area indicated by the validity area information, the UE may stop the timer and may terminate the frequency measurement. In another embodiment, the base station enables the UE transiting to the RRC inactive mode to determine whether to use the RAN notification area as the validity area, by using an indicator.

For example, when the base station indicates the UE transiting to the RRC inactive mode to use the RAN notification area as the validity area, through an indicator, the UE may perform frequency measurement within the RAN notification area while maintaining the RRC inactive mode. In another embodiment, the base station may indicate the UE transiting to the RRC inactive mode to use the validity area as the RAN notification area, through an indicator. In another embodiment, the UE may consider and use the RAN notification area as the validity area in the RRC inactive mode without an indicator, and, in the RRC idle mode, the base station may configure a separate validity area for the UE. Because the RRC message indicates both the RAN notification area and the validity area as a list of cell identifiers, signaling overhead may be reduced according to the above-described embodiment. Because the validity area does not need to be separately managed during realization of the UE, UE realization load may be reduced.

In such embodiment, the base station may configure a measurement report threshold value and the UE may report a plurality of frequencies of which signal intensities are greater than the measurement report threshold value in a configure frequency group.

When the UE performs early frequency measurement in the RRC idle mode or the RRC inactive mode, the UE may start the early frequency measurement when one of the following conditions is satisfied (operation 1f-30).

In one example, when the RRCRelease message received by the UE includes an indicator indicating to perform frequency measurement in the RRC idle mode or the RRC inactive mode and frequency information of frequencies to be measured and a frequency measurement duration (for example, a timer value) are configure, the UE may start the timer and perform frequency measurement according to the frequency information.

In one example, when the RRCRelease message received by the UE includes an indicator indicating to perform frequency measurement in the RRC idle mode or the RRC inactive mode, and configures a frequency measurement duration (for example, a timer value) but does not include frequency information of frequencies that are to be measured, the UE may first start the timer, and may perform frequency measurement according to the frequency information when system information including the frequency information is broadcast. When the UE moves to another cell and system information of the newly camped-on cell including new frequency information of frequencies to be measured in the RRC idle mode or the RRC inactive mode is broadcast, the UE may perform frequency measurement according to the new frequency information.

In other words, when the RRCRelease message does not configure frequency measurement configuration information regarding frequency measurement to be performed in the RRC idle mode or the RRC inactive mode and system information including frequency configuration information for frequency measurement in the RRC idle mode or the RRC inactive mode is broadcast, the UE may perform frequency measurement in the RRC idle mode or the RRC inactive mode, based on the frequency configuration information. When the UE moves to a new cell and camps on the new cell, the UE may update frequency measurement information with frequency configuration information for frequency measurement in the RRC idle mode or the RRC inactive mode that is broadcast to the new cell, and may re-perform the frequency measurement (operation 1f-12).

On the other hand, when the RRCRelease message configures frequency measurement configuration information regarding frequency measurement in the RRC idle mode or the RRC inactive mode, the UE may preferentially apply the frequency measurement configuration information configured in the RRCRelease message as opposed to the frequency configuration information for frequency measurement in the RRC idle mode or the RRC inactive mode, included in the broadcast system information, and may perform the frequency measurement. In other words, when the RRCRelease message configures the frequency measurement configuration information regarding the frequency measurement in the RRC idle mode or the RRC inactive mode, the UE may ignore or not consider the frequency configuration information included in the broadcast system information.

When the UE that has transited to the RRC idle mode or the RRC inactive mode needs a connection to a network for a certain reason, the UE performs a random access procedure and receives a random access response (operations 1f-20 and 1f-25).

According to one condition or a plurality of conditions from among such conditions as described above, the UE may start early frequency measurement. The UE may transmit message 3 (for example, an RRCSetupRequest or RRCResumeRequest message) to the base station while performing frequency measurement (operation 1f-35), may receive message 4 (for example, an RRCSetup or RRCResume message) from the base station in response to message 3 and thus ascertain that the random access procedure succeeds (operation 1f-40), and may transit to the RRC connected mode (operation 1f-45).

Before the UE configures up a connection on a current cell, when received system information (for example, SIB2)

including an indicator indicating supporting of the frequency measurement in the RRC idle mode or the RRC inactive mode or an indicator indicating that a result of the frequency measurement in the RRC idle mode or the RRC inactive mode may be received has been broadcast, the UE may notify the base station that the UE has a result of the frequency measurement performed in the RRC idle mode or the RRC inactive mode, through an indicator included in message 5 (for example, an RRCSetupComplete or RRCResumeComplete message).

When the UE transmits message 5 (for example, RRC Setup Complete or RRC Resume Complete), the UE may transmit message 5 including an indicator indicating that early frequency measurement was performed in the RRC idle mode or the RRC inactive mode and there is a measurement report to be transmitted. A new indicator may be defined as the indicator in message 5 to indicate that there is a measurement report, and an indicator indicating that there is UE information already defined in the RRC message (RRC Setup Complete or RRC Resume Complete) may be re-used (operation 1f-50).

In another embodiment, an indicator indicating LTE frequency measurement support or NR frequency measurement support may be defined and used as an indicator in system information. When message 5 indicates that there is a result of frequency measurement performed in the RRC idle mode or the RRC inactive mode, an indicator for a measurement report with respect to LTE frequencies and an indicator for a measurement report with respect to NR frequencies may be respectively defined and used.

When the base station confirms, through the indicator included in message 5, that early frequency measurement was performed in the RRC idle mode or the RRC inactive mode and there is a result of the frequency measurement to be reported, the base station may transmit to the UE a message indicating to transmit a measurement report, in order to receive a fast measurement report (operation 1f-55). For example, the base station may request the UE for information about the measurement report by newly defining and using UEinformationRequest as a DL-DCCH message. In response to this message, the UE may transmit a fast measurement report to the base station (operation 1f-65).

For example, in response to the DL-DCCH message, the UE may transmit a measurement report by newly defining and using a UEInformationResponse message as the UL-DCCH message. The measurement report may include, for example, a serving cell/frequency measurement result (e.g., NR-SS RSRP/RSRQ), a measurement result of a neighboring cell/frequency of a serving cell/frequency, a measurement result of a neighboring cell/frequency that the UE is able to measure, and a measurement result of a cell/frequency indicated to be measured. In another embodiment, the base station may request the UE for information about the measurement report by defining an indicator in an RRCReconfiguration message.

In response to the RRCReconfiguration message, the UE may transmit a fast measurement report to the base station (operation 1f-65). For example, in response to the RRCReconfiguration message, the UE may report a measurement report by using an RRCReconfigurationComplete message. In another embodiment, the UE may define new fields for reporting the measurement report in the UL-DCCH message, and may perform the reporting by using the new fields.

The UE may stop the early frequency measurement in the RRC idle mode or the RRC inactive mode under the following conditions.

In one example, when system information of a current cell supports a fast measurement report and after or when the UE transmits the information that there is a report on an fast measurement report to the base station through the RRC message (for example, message 5). when the UE configures up a connection with a network while performing frequency measurement in the RRC idle mode or the RRC inactive mode and stops a timer and measurement in response to the RRCSetup message or the RRCResume message as message 4, system information of a current cell supports a fast measurement report, and the UE tries to transmit, to the base station through an RRC message (e.g., message 5), the information that there is a report on the early frequency measurement result.

In one example, when a measurement report timer (e.g., T331) expires.

In on example, when the UE deviates from an area indicated by area information of frequency measurement in the RRC idle mode or the RRC inactive mode configured in the RRCRelease message.

According to one condition or a plurality of conditions from among the aforementioned conditions, the UE may stop the frequency measurement in the RRC idle mode or the RRC inactive mode (IDLE mode/INACTIVE mode measurement) (operation 1f-60).

The UE performs measurement with respect to frequencies measurable by the UE in information about early frequency measurement configuration, namely, frequencies supported by the information about early frequency measurement configuration. In this case, the UE may select a frequency that is to be preferentially measured according to a pre-set priority.

The UE may operate as follows to transmit a measurement report according to the first embodiment of fast performing frequency measurement in the RRC idle mode or the RRC inactive mode and transmitting a measurement report.

The UE may perform the following operation when receiving the RRCSetup message or the RRCResume message as message 4 from the base station.

When system information (e.g., SIB2) broadcasts or includes an indicator (IDLE or INACTIVE Mode Measurement) indicating that the frequency measurement in the RRC idle mode or the RRC inactive mode is supported, and the UE has a result of the frequency measurement performed in the RRC idle mode or the RRC inactive mode.

In one example, the UE includes an indicator (idle or INACTIVE Measavailable) indicating that there is a result of the frequency measurement performed in the RRC idle mode or the RRC inactive mode, in the RRCSetupComplete message or the RRCResumeComplete message as message 5. Accordingly, the UE may indicate, through message 5 including the indicator, that there is frequency measurement information about frequency measurement in the RRC idle mode or the RRC inactive mode that is to be reported to the base station.

In one example, because the UE may transmit a measurement report, the UE stops a timer (e.g., T331) for the frequency measurement in the RRC idle mode or the RRC inactive mode. The UE may stop the frequency measurement and may discard the frequency measurement configuration information.

FIG. 1G illustrates a procedure between a UE and a gNB where the UE performs early frequency measurement in the RRC idle mode or the RRC inactive mode and transmit a fast measurement report.

The matters of the first embodiment are applicable to the second embodiment. In the second embodiment, the base station may configure a plurality of frequency measurement groups when the base station configures, for the UE, frequency measurement configuration information of frequencies that are to be measured by the UE in the RRC idle mode or the RRC inactive mode, through an RRCRelease message, may enable the UE to perform frequency measurement in the RRC idle mode or the RRC inactive mode, and the UE may indicate that there is a result of the frequency measurement, through a preamble of a random access procedure when configuring a connection with a network, indicates a measurement report through a random access response, and configure to perform a fast measurement report through message 3.

In FIG. 1G, when the UE in the RRC connected mode receives, from the base station, frequency measurement configuration information together with an indication to release an RRC connection and transit to the RRC idle mode or the RRC inactive mode, the UE may perform frequency measurement in the RRC idle mode or the RRC inactive mode for a configure duration or time period. However, when the frequency measurement configuration information includes no information about a list of frequencies to be measured, and frequency measurement configuration information for frequency measurement by the UE in the RRC idle mode or the RRC inactive mode is broadcast by a cell camped-on during a cell reselection procedure, the UE may receive the frequency measurement configuration information and may perform frequency measurement.

At this time, the UE may perform one of the following embodiments in order to deal with Scells efficiently configured for CA and secondary cell groups (SCGs) efficiently configured for DC when the UE receives the RRCRelease message and transits to the RRC inactive mode.

In one embodiment 1, configuration information about SCells or configuration information about SCGs may be all released. When configuring a connection later, the base station may fast configure information about the Scells for CA and the SCGs for DC for the UE, based on a fast measurement report, by using the RRCResume message or the RRCReconfiguration message. Embodiment 1 is favorable to a memory aspect because the configuration information about the SCells or the configuration information about the SCGs does not need to be maintained, and is easily implemented because the base station does not need to retrieve existing configuration information about the Scells or the SCGs from a source gNB.

In one embodiment, configuration information about SCells or configuration information about SCGs may be stored, and transmission or bearer configuration for Scells or SCGs may be suspended. When configuring a connection later, the base station may resume the connection to re-use the information about the Scells for CA and the SCGs for DC for the UE, based on a fast measurement report, by using the RRCResume message or the RRCReconfiguration message, or may update (delta configuration) only some of the configuration information, or may completely newly configure the configuration information.

In such embodiment, because the UE maintains the configuration information about the SCells or the configuration information about the SCGs, the base station may use existing configuration information about the SCells or SCGs without change, thereby reducing signaling overhead, and the UE may fast apply and start CA or DC.

When an RRC connection with a network needs to be configured the UE may indicate that there is a measurement report performed in the RRC idle mode or the RRC inactive mode, while configuring an RRC connection with the base station.

When a cell trying to configure a current connection supports a fast measurement report when the UE in the RRC idle mode or the RRC inactive mode re-tries to configure up a connection with a network, the UE may indicate, through a preamble, the information that there is a result of the frequency measurement, when performing a random access (operation 1g-20). For example, particular preambles may be configured to be used as an indicator in system information. Alternatively, particular preambles may be configured to by indicating that many uplink transmission resources are needed.

Alternatively, particular preambles may be promised to be used as an indicator. When the base station identifies the indicator, the base station may include, in a random access response, an indicator indicating to transmit a measurement report, and transmit the random access response including the indicator. In another embodiment, because the random access response transmitted by the base station may indicate an instruction to transmit a measurement report, an indicator may be omitted (operation 1g-25).

When the UE receives the uplink transmission resources from the random access response, the UE may transmit a measurement report together with message 3 (for example, an RRCSetupRequest message or an RRCResumeRequest message) (operation 1g-35). Thereafter, the UE may perform connection configuration with a network, and, when the base station transmits message 4 (for example, an RRCSetup message or an RRCResume message) to the UE, the base station may transmit message 4 including CA configuration information or DC configuration information. Accordingly, the base station may fast resume, or change, or re-configure CA or DC for the UE (operation 1g-40). Thus, compared with the first embodiment, transmit a fast measurement report may be transmitted.

The UE may stop the fast measurement report in the RRC idle mode or the RRC inactive mode under the following conditions: when system information of a current cell supports a fast measurement report and after or when the UE transmits the information that there is a report on an early frequency measurement result to the base station through a preamble in a random access procedure; when the UE stops a timer and measurement when receiving an indication of transmitting a measurement report through a random access response (PAR) in a random access procedure for configuring a connection with a network while performing frequency measurement in the RRC idle mode or the RRC inactive mode, system information of a current cell supports a fast measurement report, and the UE tries to transmit a fast measurement report to the base station through an RRC message (e.g., message 3); when a measurement report timer (e.g., T331) expires; and when the UE deviates from an area indicated by area information of frequency measurement in the RRC idle mode or the RRC inactive mode configured in the RRCRelease message.

According to one condition or a plurality of conditions from among the aforementioned conditions, the UE may stop the frequency measurement in the RRC idle mode or the RRC inactive mode (IDLE mode/INACTIVE mode measurement) (operation 1g-60).

The UE performs measurement with respect to frequencies measurable by the UE in information about early frequency measurement configuration, namely, frequencies supported by the information about early frequency measurement configuration. In this case, the UE may select a frequency that is to be preferentially measured according to a pre-set priority.

The UE may operate as follows to transmit a measurement report according to the second embodiment of fast performing frequency measurement in the RRC idle mode or the RRC inactive mode and transmitting a fast measurement report.

In on example, the UE may perform the following operation when receiving a random access response from the base station and trying to transmit message 3. When system information (e.g., SIB2) broadcasts or includes an indicator (IDLE or INACTIVE Mode Measurement) indicating that the frequency measurement in the RRC idle mode or the RRC inactive mode is supported, and the UE has a result of the frequency measurement performed in the RRC idle mode or the RRC inactive mode.

The UE includes a measurement report performed in the RRC idle mode or the RRC inactive mode, in message 3 (RRCSetupRequest message or RRCResumeRequest message), thereby configuring message 3. In another embodiment, the RRC message (e.g., message 3) and the measurement report may be multiplexed in the MAC layer and transmitted. Accordingly, the UE may transmit a measurement report about frequency measurement in the RRC idle mode or the RRC inactive mode that is to be reported to the base station, through the corresponding message.

Because the UE may transmit a measurement report, the UE stops a timer (e.g., T331) for the frequency measurement in the RRC idle mode or the RRC inactive mode. The UE may stop the frequency measurement and may discard the frequency measurement configuration information.

FIG. 1H illustrates a procedure between a UE and a gNB where the UE performs early frequency measurement in the RRC idle mode or the RRC inactive mode and transmit a fast measurement report according to an embodiment of the disclosure.

The matters of the first or second embodiment are applicable to the third embodiment. In the third embodiment, the base station may configure a plurality of frequency measurement groups when the base station configures, for the UE, frequency measurement configuration information of frequencies that are to be measured by the UE in the RRC idle mode or the RRC inactive mode, through an RRCRelease message, may enable the UE to perform frequency measurement in the RRC idle mode or the RRC inactive mode, and the UE may indicate, through message 3, that there is a result of the frequency measurement, when configuring up a connection with a network, indicates a measurement report through message 4, and configure transmitting a measurement report through message 5.

Accordingly, the a fast measurement report may be transmitted as compared with the first embodiment, and, as compared with the second embodiment, the measurement report may be transmitted with reinforced security, because the UE in the RRC inactive mode activates security algorithms with respect to SRB1 from a time point when the UE transmits message 3. In other words, message 4 and message 5 may be encrypted to a new encryption key in the PDCP layer and integrity-protected and transmitted.

An indicator indicating that there is a result of performing frequency measurement performed in the RRC idle mode or the RRC inactive mode may be included in message 3 (for example, an RRCSetupRequest message or an RRCResumeRequest message) that is transmitted after the terminal performs random access, and then transmitted. When the base station transmits message 4 (for example, an RRCSetup message or an RRCResume message) to the terminal, the base station may include, in message 4, an indicator indicating the terminal to transmit a measurement report and transmit message 4 including the indicator. In another embodiment, because message 4 may indicate an instruction to transmit a measurement report, the indicator may be omitted. The terminal may transmit a measurement report through message 5 (for example, an RRCSetupComplete message or an RRCResumeComplete message).

Because the terminal in the RRC inactive mode resumes or activates a security procedure (encryption & decryption or integrity protection and verification) regarding Signaling Radio Bearer1 (SRB1) when transmitting an RRCResumeRequest message, the terminal may reinforce security and receive message 4, and, even when transmitting a measurement report through message 5, the terminal may reinforce security and transmit a measurement report. The base station may include CA configuration information or DC configuration information in an RRC message and transmit the RRC message, by using a measurement report. Accordingly, the base station may fast resume, change, or reconfigure CA or DC for the terminal.

In FIG. 1H, when the UE in the RRC connected mode receives, from the base station, frequency measurement configuration information together with an indication to release an RRC connection and transit to the RRC idle mode or the RRC inactive mode, the UE may perform frequency measurement in the RRC idle mode or the RRC inactive mode for a configure duration or time period. However, when the frequency measurement configuration information includes no information about a list of frequencies to be measured, and frequency measurement configuration information for frequency measurement by the UE in the RRC idle mode or the RRC inactive mode is broadcast by a cell camped-on during a cell reselection procedure, the UE may receive the frequency measurement configuration information and may perform frequency measurement.

At this time, the UE may perform one of the following embodiments in order to deal with Scells efficiently configured for CA and SCGs efficiently configured for DC when the UE receives the RRCRelease message and transits to the RRC inactive mode.

In one embodiment 1, configuration information about SCells or configuration information about SCGs may be all released. When configuring a connection later, the base station may fast configure information about the Scells for CA and the SCGs for DC for the UE, based on a fast measurement report, by using the RRCResume message or the RRCReconfiguration message. Embodiment 1 is favorable to a memory aspect because the configuration information about the SCells or the configuration information about the SCGs does not need to be maintained, and is easily implemented because the base station does not need to retrieve existing configuration information about the Scells or the SCGs from a source gNB.

In one embodiment 2, configuration information about SCells or configuration information about SCGs may be stored, and transmission or bearer configuration for Scells or SCGs may be suspended. When configuring a connection later, the base station may resume the connection to re-use the information about the Scells for CA and the SCGs for DC for the UE, based on a measurement report, by using the RRCResume message or the RRCReconfiguration message, or may update (delta configuration) only some of the configuration information, or may completely newly configure the configuration information. In such embodiment 2, because the UE maintains the configuration information about the SCells or the configuration information about the SCGs, the base station may use existing configuration information about the SCells or SCGs without change, thereby reducing signaling overhead, and the UE may fast apply and start CA or DC.

When an RRC connection with a network needs to be configured, the UE may indicate that there is a measurement report performed in the RRC idle mode or the RRC inactive mode, while configuring an RRC connection with the base station.

When a cell trying to configure a current connection supports a fast measurement report when the UE in the RRC idle mode or the RRC inactive mode re-tries to configure a connection with a network, the UE may indicate, through message 3 (for example, an RRCSetupRequest message or an RRCResumeRequest message), the information that there is a result of the frequency measurement, after performing a random access (operation 1h-35). When the base station confirms the indication of the UE, the base station may transmit message 4 (for example, an RRCSetup message or an RRCResume message) including an indicator indicating the UE to transmit a measurement report. In another embodiment, because message 4 transmitted by the base station may indicate an instruction to transmit a measurement report, an indicator may be omitted (operation 1h-40).

In response to message 4, the UE may transmit a measurement report together with message 5 (for example, an RRCSetupComplete message or an RRCResumeComplete message) (operation 1h-50). Thereafter, the UE may perform connection configuration with a network, and, when the base station transmits message 4 (for example, an RRCSetup message or an RRCResume message) or an RRCReconfiguration message to the UE, the base station may transmit message 4 including CA configuration information or DC configuration information. Accordingly, the base station may fast resume, or change, or re-configure CA or DC for the UE.

The UE may stop the early frequency measurement in the RRC idle mode or the RRC inactive mode under the following conditions: when system information of a current cell supports a fast measurement report and after or when the UE transmits the information that there is a fast measurement report to the base station through message 3; when the UE stops a timer and measurement when receiving an indication of a measurement report through message 4 in a random access procedure for configuring a connection with a network while performing frequency measurement in the RRC idle mode or the RRC inactive mode, system information of a current cell supports a fast measurement report, and the UE tries to transmit, to the base station through an RRC message (e.g., message 3), the information that there is a report on the early frequency measurement result; when the UE tries to transmit a measurement report through message 5; when a measurement report timer (e.g., T331) expires; and when the UE deviates from an area indicated by area information of frequency measurement in the RRC idle mode or the RRC inactive mode configured in the RRCRelease message.

According to one condition or a plurality of conditions from among the aforementioned conditions, the UE may stop the frequency measurement in the RRC idle mode or the RRC inactive mode (IDLE mode/INACTIVE mode measurement).

The UE performs measurement with respect to frequencies measurable by the UE in information about early frequency measurement configuration, namely, frequencies supported by the information about early frequency measurement configuration. In this case, the UE may select a frequency that is to be preferentially measured according to a pre-set priority.

The UE may operate as follows to transmit a measurement report according to the third embodiment of fast performing frequency measurement in the RRC idle mode or the RRC inactive mode and transmitting a measurement report.

In one embodiment, the UE may perform the following operation when receiving a random access response from the base station and receiving message 4.

When system information (e.g., SIB2) broadcasts or includes an indicator (IDLE or INACTIVE Mode Measurement) indicating that the frequency measurement in the RRC idle mode or the RRC inactive mode is supported, and the UE has a result of the frequency measurement performed in the RRC idle mode or the RRC inactive mode.

the UE includes a measurement report performed in the RRC idle mode or the RRC inactive mode, in message 5 (RRCSetupRequest message or RRCResumeRequest message), thereby configuring message 3. In another embodiment, the RRC message (e.g., message 5) and the measurement report may be multiplexed in the MAC layer and transmitted. Accordingly, the UE may transmit a measurement report in the RRC idle mode or the RRC inactive mode that is to be reported to the base station, through the corresponding message.

Because the UE may transmit a measurement report, the UE stops a timer (e.g., T331) for the frequency measurement in the RRC idle mode or the RRC inactive mode. The UE may stop the frequency measurement and may discard the frequency measurement configuration information.

Below is described an efficient signaling scheme for allowing a network or a base station to more efficiently configure or update frequency measurement configuration information for a terminal that is movable in the RRC inactive mode.

A UE in the RRC idle mode and a UE in the RRC inactive mode are greatly different from each other in that the UE in the RRC inactive mode may configure up a fast connection because the base station and the UE store terminal context and re-use the UE context when configuring up a connection next and that the UE in the RRC inactive mode periodically updates a RAN notification area and thus update an area needing to maintain the RRC inactive mode from a network.

According to the disclosure, when the UE in the RRC connected mode receives, from the base station, frequency measurement configuration information together with an indication of releasing an RRC connection and transiting to the RRC inactive mode, the UE may perform frequency measurement in the RRC inactive mode for a duration or time period configured in the frequency measurement configuration information. When the UE in the RRC inactive mode deviates from a configured RAN notification area while moving, the UE configures a connection to the network in order to perform a RNAU procedure. In one embodiment described in the disclosure, to update the RAN notification area, the base station may configure, update, or partially change new frequency measurement configuration information for the UE that has performed a connected to the network.

In detail, the disclosure describes two procedures of updating the RAN notification area.

FIG. 1I illustrates a procedure of updating a first RAN notification area, according to an embodiment of the disclosure.

When the UE in the RRC inactive mode deviates from a RAN notification area while moving, the UE performs a random access procedure to perform a RAN notification area update procedure, and transmits message 3 (for example, an RRCResumeRequest message) to the base station to perform a connection with a network (operation 1*i*-20). The base station checks a connection resume identifier of the UE included in message 3 and retrieves a UE context from a source gNB. The base station checks a connection resume cause included in message 3 and accordingly may ascertain that the UE needs to update the RAN notification area. To update the RAN notification area, the base station transmits message 4 (for example, an RRCResume message) to the UE so that the UE transits to the RRC connected mode (operations 1*i*-25 and 1*i*-30).

The UE indicates, through message 5, that connection has been properly established (operation 1*i*-35). The base station includes a new RAN notification area in an RRCRelease message to update the RAN notification area, and transmits the RRCRelease message including the new RAN notification area to the UE (operation 1*i*-40) to indicate that the UE transits back to the RRC inactive mode. In response to the RRCRelease message, the UE checks and reflects the new RAN notification area and thus maintains mobility and transits to the RRC inactive mode.

FIG. 1J illustrates a procedure of updating a second RAN notification area, according to an embodiment of the disclosure.

When the UE in the RRC inactive mode deviates from a RAN notification area while moving, the UE performs a random access procedure to perform a RAN notification area update procedure, and transmits message 3 (for example, an RRCResumeRequest message) to the base station to perform a connection with a network (operation 1*j*-20). The base station checks a connection resume identifier of the UE included in message 3 and retrieves a UE context from a source gNB. The base station checks a connection resume cause included in message 3 and accordingly may ascertain that the UE needs to update the RAN notification area.

The base station includes a new RAN notification area in an RRCRelease message to update the RAN notification area and transmits the RRCRelease message including the new RAN notification area to the UE, and indicates that the UE needs to maintain the RRC inactive mode. In response to the RRCRelease message, the UE checks and reflects the new RAN notification area and thus maintains mobility and also maintains the RRC inactive mode (operation 1*j*-40). The second RAN notification area updating procedure of FIG. 1J may reduce signaling overhead compared with the first RAN notification area updating procedure of FIG. 1I and does not require a state transition of the UE. In other words, the UE may perform a RAN notification area updating procedure while maintaining the RRC inactive mode.

In the first RAN notification area updating procedure or the second RAN notification area updating procedure, the base station may retrieve a UE context from a source gNB through a connection resume identifier indicated by the UE in message 3 (RRC Resume Request), and may determine whether the terminal is configured to perform frequency measurement in the RRC inactive mode. The connection resume cause included in message 3 may indicate that a connection is resumed to update the RAN notification area.

In another embodiment, when the UE transmits message 3 to update the RAN notification area, the UE may include, in message 3 in the form of an indicator, information that frequency measurement has been configured to be performed in the RRC inactive mode or information that a T331 timer has expired or is under operation or new frequency configuration information is necessary, and may transmit message 3 including the information to the base station. After the base station determines whether the UE is able to perform frequency measurement in the RRC inactive mode, when the base station transmits, to the UE, an RRC message (for example, an RRCRelease message) including information that the RAN notification area is updated, the base station may include new frequency measurement configuration information in the RRC message and transmit the RRC message including the new frequency measurement configuration information (operations 1*i*-40 and 1*j*-40).

The new frequency measurement configuration information may include configuration information such as a frequency list to be measured, a list of physical cell identifiers, a measurement duration, or a validity area on which measurement is to be performed (e.g., a cell identifier list). Accordingly, when the UE in the RRC inactive mode passes coverages supported by the base station or different cells while moving, the UE having mobility may fast report the frequency measurement configuration information when configuring a connection with a network later and may fast configure DC or CA, while newly updating or changing frequency measurement configuration information in the RRC inactive mode via a RAN notification area update procedure.

According to embodiments of the disclosure, a procedure is described in which, in the case that a base station or cell to which a UE is connected supports frequency measurement in the RRC idle mode or the RRC inactive mode or system information indicates that frequency measurement is supported, after the UE transmit a measurement report to the base station, the UE stops a timer (T331) for frequency measurement in the RRC idle mode or the RRC inactive mode, and discards or release the frequency measurement configuration information or discard the measurement report.

According to the disclosure, the UE in the RRC inactive mode or the RRC idle mode configures a certain area to perform frequency measurement (for example, a validity area), through the RRCRelease message. In other words, the UE performs frequency measurement in the RRC inactive mode or the RRC idle mode only within the validity area, and, when being out of the validity area, the UE may stop the timer, release the frequency measurement configuration information, discard the measurement report, or stop frequency measurement. The validity area may be indicated as, for example, a list of physical cell identifiers or a list of RAN notification area indicators.

The disclosure describes one embodiment of separately configuring a validity area and a RAN notification area for the UE in the RRC inactive mode, and a scheme for reducing the burden of the UE and signaling overhead by enabling the UE in the RRC inactive mode to replace the RAN notification area with the validity area or vice versa (i.e., to replace the validity area with the RAN notification area). When a certain validity area is indicated to a UE, to realize the UE, a tracking area needs to be maintained and updated, the RAN notification area also needs to be maintained and updated, and the validity area also needs to be maintained and updated, thereby increasing overhead.

In other words, when the UE receives the RRCRelease message and receives information indicating that the UE needs to transit to the RRC inactive mode, when there is frequency measurement configuration information and either there is an indicator or use of the RAN notification area is indicated, the UE may transit to the RRC inactive mode and may perform frequency measurement by considering the RAN notification area as the validity area. In other words, when the UE receives the RRCRelease message and receives information indicating that the UE needs to transit to the RRC inactive mode, when there is frequency measurement configuration information and either there are no indicators or use of the RAN notification area is not indicated, or when a certain validity area has been configured and is indicated, the UE may transit to the RRC inactive mode, may perform frequency measurement by considering the validity area, and may manage mobility of the RRC inactive mode according to the RAN notification area.

Below is described an efficient operation that a UE capable of performing frequency measurement or configured to perform frequency measurement, in the RRC inactive mode, needs to perform in the first RAN notification area update procedure or the second RAN notification area update procedure: when the UE has transmitted message 3 to perform the first RAN notification area update procedure and has received the RRCRelease message in the first RAN notification area update procedure or the second RAN notification area update procedure; or when the UE has received the RRCRelease message.

In one example, when the UE has received the RRCRelease message, the RRCRelease message includes frequency measurement configuration information, and the frequency measurement configuration information includes information about a frequency measurement duration but does not include frequency measurement list information.

In such example, the UE configures the frequency measurement duration as a timer value and drives a timer.

In such example, the UE perform a frequency measurement procedure, based on pre-stored information (information indicated by a previous RRCRelease message or information indicated by system information received last). In another embodiment, the UE may determine the pre-stored information to be invalid information, discard the pre-stored information, perform a cell reselection procedure, and receive new frequency measurement information from system information. When the UE has received frequency measurement information and the frequency measurement has been stopped, the UE may resume the stopped frequency measurement. On the other hand, when the frequency measurement has never been stopped, the UE may newly start frequency measurement.

When the UE has received the RRCRelease message, the RRCRelease message includes frequency measurement configuration information, and the frequency measurement configuration information includes information about a frequency measurement duration and frequency information of frequencies that are to be measured: the UE configures the frequency measurement duration as a timer value and drives a timer; and the UE may determine the pre-stored information to be invalid information, discard the pre-stored information, and may receive and store new frequency measurement information included in an RRCRelease message and perform frequency measurement. When the frequency measurement has been stopped, the UE may resume the stopped frequency measurement. On the other hand, when the frequency measurement has never been stopped, the UE may newly start frequency measurement.

When the UE has transmitted message 3 and has received the RRCRelease message to perform a RAN notification area update procedure while performing frequency measurement in the RRC inactive mode, namely, when the RRC inactive mode is maintained without RRC mode transition and in this state the UE has received the RRCRelease message.

When the UE has transmitted message 3 and has received the RRCRelease message to perform a RAN notification area update procedure while performing frequency measurement in the RRC inactive mode and when the RRCRelease message does not include new frequency measurement configuration information, the UE continuously perform frequency measurement, based on existing frequency configuration information.

When the RRCRelease message includes new frequency measurement configuration information: the UE may discard or release existing frequency measurement configuration information; and the UE configures a duration or timer value included in the new frequency measurement configuration information and thus initializes a timer and re-drives the timer.

When the frequency measurement configuration information includes a frequency measurement list, the UE performs frequency measurement on the frequencies included in the frequency measurement list.

When the frequency measurement configuration information includes no frequency measurement lists, the UE may perform a cell reselection procedure, and, when system information of a camped-on cell includes the frequency measurement information, may receive and store the frequency measurement information and perform frequency measurement.

In another embodiment, when the UE transmits message 3 to perform a RAN notification area update procedure while performing frequency measurement in the RRC inactive mode, the UE may stop the frequency measurement and receives the RRCRelease message, and, when the RRCRelease message does not include new frequency measurement information, may resume frequency measurement by using existing frequency measurement information. On the other hand, when the RRCRelease message includes new frequency measurement information, the UE may resume frequency measurement by using the new frequency measurement information.

Below is described how to perform frequency measurement when the UE in the RRC inactive mode has fallen back to the RRC idle mode due to an indication of the base station while trying to resume a connection with a network.

FIG. 1K illustrates a procedure between a UE and a gNB where the UE in the RRC inactive mode falls back to the RRC idle mode due to an indication of the base station while trying to resume a connection with a network according to an embodiment of the disclosure.

In the disclosure, a first embodiment of processing frequency measurement when the UE in the RRC inactive mode has fallen back to the RRC idle mode due to an indication of the base station while trying to resume a connection with a network.

When the UE transmits message 3 (operation 1k-20) and the base station transmits an RRCSetup message as message 4 (operation 1k-40) in order to perform a RAN notification area update procedure while the UE is performing frequency measurement in the RRC inactive mode, and thus the UE needs to cancel a connection resume procedure or transit from the RRC inactive mode to the RRC idle mode (operation 1k-45), the UE may stop a timer for the frequency measurement, discard the frequency measurement configuration information, and stop the frequency measurement. The UE may also discard a measurement report. In other words, when the UE in the RRC inactive mode is made to fall back to the RRC idle mod, the UE discards and releases all of the existing preset information, and thus implementation of the UE and the base station may be simplified.

In the disclosure, a second embodiment of processing frequency measurement when the UE in the RRC inactive mode has fallen back to the RRC idle mode due to an indication of the base station while trying to resume a connection with a network.

When the UE transmits message 3 (operation 1k-20) and the base station transmits an RRCSetup message as message 4 (operation 1k-40) in order to perform a RAN notification area update procedure while the UE is performing frequency measurement in the RRC inactive mode, and thus the UE needs to cancel a connection resume procedure or transit from the RRC inactive mode to the RRC idle mode (operation 1k-45), the UE may indicate that there is a measurement report, and may transmit a measurement report, as in the above-described embodiments. In other words, the UE may continuously make good use of a measurement report performed by the UE. The base station may determine whether a measurement report is valid. For example, the UE may perform the following operations.

When system information (e.g., SIB2) broadcasts or includes an indicator (IDLE or INACTIVE Mode Measurement) indicating that the frequency measurement in the RRC idle mode or the RRC inactive mode is supported, and the UE has a result of the frequency measurement performed in the RRC idle mode or the RRC inactive mode, the UE includes, in message 5 (RRCSetupComplete message (operation 1k-50)), an indicator of frequency measurement in the RRC idle mode or the RRC inactive mode or a measurement report (when message 3 indicates that there is a result of frequency measurement).

In another embodiment, when a measurement report is transmitted, an RRC message (e.g., message 5) and the measurement report may be multiplexed in the MAC layer and transmitted. Accordingly, the UE may indicate, through message 5, that there is frequency measurement information about frequency measurement in the RRC idle mode or the RRC inactive mode that is to be reported to the base station or report the measurement report through message 5.

Because the UE may report the measurement report, the UE stops a timer (e.g., T331) for the frequency measurement in the RRC idle mode or the RRC inactive mode. The UE may stop the frequency measurement and may discard frequency measurement configuration information.

According to an embodiment, the frequency measurement configuration information may be configured as different information elements (IEs) for the RRC idle mode and the RRC inactive mode, respectively. In other words, the UE may indicate frequency measurement by including different pieces of frequency measurement configuration information according to RRC modes to which the UE transits. In addition, the UE may store results of measurements performed in the RRC idle mode and the RRC inactive mode in different variables and may differently transmit the measurement reports. Because the RRC idle mode and the RRC inactive mode are different from each other in terms of a setup procedure of a connection with a network and detailed operations, it may be more efficient to separately manage configuration information (e.g., a frequency measurement list or timer value (duration) or a validity area) or configure result report parameters.

FIG. 1L illustrates a flowchart of an operation, performed by a UE, of performing frequency measurement in the RRC idle mode or the RRC inactive mode perform and transmitting the measurement report, according to an embodiment of the disclosure.

Referring to FIG. 1L, in response to an RRC message, the UE drives a timer for the frequency measurement in the RRC idle mode or the RRC inactive mode, and checks frequency measurement configuration information for the frequency measurement in the RRC idle mode or the RRC inactive mode, from the RRC message, in operation 1l-05. In operation 1l-10, when there is the frequency measurement configuration information, the UE performs frequency measurement in the RRC idle mode or the RRC inactive mode, based on the frequency measurement configuration information.

When the frequency measurement configuration information is not included in the RRC message, the UE receives the frequency measurement information from system information, in operation 1l-05, and may perform frequency measurement in the RRC idle mode or the RRC inactive mode, in operation 1l-10. The RRC message may be received by the UE in the RRC inactive mode even in a RAN notification area update procedure, and, every time the RAN notification area update procedure is performed, new frequency measurement information may be configured in the RRC message so that the frequency measurement is continued. In operation 1l-15, when the UE performs frequency measurement, the UE stores a result of the frequency measurement, and, when system information of a cell that has configured a connection with a network includes an indicator indicating that the system information supports of the frequency measurement in the RRC idle mode or the RRC inactive mode, and the connection with the network is configured, the UE receives message 4 and stops the timer.

The UE may notify, through message 5, that there is a result of frequency measurement in the RRC idle mode or the RRC inactive mode. When a base station requests a result of frequency measurement in the RRC idle mode or the RRC inactive mode, the UE transmits a measurement report in the RRC idle mode or the RRC inactive mode to the base station, in operation 1l-20. When the measurement report in the RRC idle mode or the RRC inactive mode is successfully delivered to the base station, the UE discards the measurement report in the RRC idle mode or the RRC inactive mode.

FIG. 1M illustrates a structure of a UE according to an embodiment of the disclosure.

Referring to FIG. 1M, the UE includes a radio frequency (RF) processor 1m-10, a baseband processor 1m-20, a memory 1m-30, and a controller 1m-40.

The RF processor 1m-10 may perform functions for transmitting and receiving a signal via a radio channel, such as a band conversion, amplification, and the like of the signal. In other words, the RF processor 1m-10 may up-convert a baseband signal provided from the baseband processor 1m-20, to an RF band signal and transmit the RF band signal through an antenna, and down-convert an RF band signal received through an antenna, to a baseband signal. For example, the RF processor 1m-10 may include a transmit filter, a receive filter, an amplifier, a mixer, an oscillator, a digital-to-analog converter (DAC), and an analog-to-digital converter (ADC). Although only a single antenna is illustrated in FIG. 1M, the UE may include multiple antennas.

The RF processor 1m-10 may include a plurality of RF chains. The RF processor 1m-10 may perform beamforming. For beamforming, the RF processor 1m-10 may adjust phases and amplitudes of signals transmitted or received through multiple antennas or antenna elements. The RF processor 1m-10 may perform a multiple input multiple output (MIMO) operation and may receive layers (or data of multiple layers) in the MIMO operation. The RF processor 1m-10 may perform received beam sweeping by appropriately configuring multiple antennas or antenna elements, or may adjust a direction and a beam width of the received beam such that the received beam coordinates with a transmit beam, under the control of the controller 1m-40.

The baseband processor 1m-20 may perform conversion between a baseband signal and a bitstream based on physical layer specifications of a system. For example, for data transmission, the baseband processor 1m-20 may generate complex symbols by encoding and modulating a transmit bitstream. For data reception, the baseband processor 1m-20 may reconstruct a received bitstream by demodulating and decoding a baseband signal provided by the RF processor 1m-10.

For example, according to an OFDM scheme, for data transmission, the baseband processor 1m-20 may generate complex symbols by encoding and modulating a transmit bitstream, map the complex symbols to subcarriers, and then configure OFDM symbols by performing IFFT and CP insertion. For data reception, the baseband processor 1m-20 may split a baseband signal provided from the RF processor 1m-10, in OFDM symbol units, reconstruct signals mapped to subcarriers by performing fast Fourier transformation (FFT), and then reconstruct a received bitstream by demodulating and decoding the signals.

The baseband processor 1m-20 and the RF processor 1m-10 transmit and receive signals as described above. Accordingly, each of the baseband processor 1m-20 and the RF processor 1m-10 may also be called a transmitter, a receiver, a transceiver, or a transceiver. At least one of the baseband processor 1m-20 or the RF processor 1m-10 may include multiple communication modules to support multiple different radio access technologies. Also, at least one of the baseband processor 1m-20 or the RF processor 1m-10 may include multiple different communication modules to process signals of different frequency bands.

For example, the different radio access technologies may include an LTE network, an NR network, etc. The different frequency bands may include a super high frequency (SHF) (e.g., 2.5 GHz and 5 GHz) band and a millimeter wave (mmWave) (e.g., 60 GHz) band. The UE may transmit or receive a signal to or from a base station by using the baseband processor 1m-20 and the RF processor 1m-10. The signal may include control information and data.

The memory 1m-30 may store data for operations of the UE, e.g., basic programs, application programs, and configuration information. The memory 1m-30 may provide the stored data upon request by the controller 1m-40. The memory 1m-30 may be composed of memory media, such as read-only memory (ROM), random access memory (RAM), hard disks, compact disc (CD)-ROM, and digital versatile discs (DVDs), or a combination of the memory media. The memory 1m-30 may be composed of a plurality of memories.

The controller 1m-40 controls all operations of the UE. For example, the controller 1m-40 may transmit and receive signals through the baseband processor 1m-20 and the RF processor 1m-10. Also, the controller 1m-40 may write data to and read data from the memory 1m-30. To this end, the controller 1m-40 may include at least one processor. For example, the controller 1m-40 may include a communication processor (CP) performing control for communication, and an application processor (AP) controlling an upper layer, such as an application program. According to an embodiment, the controller 1m-40 may include a multi-connectivity processor 1m-42 configured to process a procedures operating in a multi-connectivity mode.

FIG. 1N illustrates a structure of a transmission reception point (TRP) device in a mobile communication system according to an embodiment of the disclosure.

Referring to FIG. 1N, a base station may include an RF processor 1n-10, a baseband processor 1n-20, a transceiver 1n-30, a memory 1n-40, and a controller 1n-50.

The RF processor 1n-10 may perform functions for transmitting and receiving a signal via a radio channel, such as a band conversion, amplification, and the like of the signal. In other words, the RF processor 1n-10 may up-convert a baseband signal provided from the baseband processor 1n-20, to an RF band signal and transmit the RF band signal through an antenna, and down-convert an RF band signal received through an antenna, to a baseband signal. For example, the RF processor 1n-10 may include a transmitting filter, a receiving filter, an amplifier, a mixer, an oscillator, a DAC, an ADC, or the like.

Although only a single antenna is illustrated in FIG. 1N, a first connection node may include multiple antennas. The RF processor 1n-10 may include a plurality of RF chains. The RF processor 1n-10 may perform beamforming. For beamforming, the RF processor 1n-10 may adjust phases and amplitudes of signals transmitted or received through multiple antennas or antenna elements. The RF processor 1n-10 may perform a downlink (DL) MIMO operation by transmitting at least one layer.

The baseband processor 1n-20 may perform conversion between a baseband signal and a bitstream based on physical layer specifications of a first radio access technology. For example, for data transmission, the baseband processor 1n-20 may generate complex symbols by encoding and modulating a transmit bitstream. For data reception, the baseband processor 1n-20 may reconstruct a received bitstream by demodulating and decoding a baseband signal provided by the RF processor 1n-10. For example, according to an OFDM scheme, for data transmission, the baseband processor 1n-20 may generate complex symbols by encoding and modulating a transmit bitstream, map the complex symbols to subcarriers, and then configure OFDM symbols by performing IFFT and CP insertion.

For data reception, the baseband processor 1n-20 may split a baseband signal provided from the RF processor 1n-10, in OFDM symbol units, reconstruct signals mapped to subcarriers by performing FFT, and then reconstruct a received bitstream by demodulating and decoding the signals. The baseband processor 1n-20 and the RF processor 1n-10 may transmit and receive signals as described above. Accordingly, each of the baseband processor 1n-20 and the RF processor 1n-10 may also be called a transmitter, a receiver, a transceiver, a transceiver, or a wireless transceiver.

The transceiver 1n-30 may provide an interface for communicating with other nodes in a network. The base station may transmit or receive a signal to or from a UE by using the baseband processor 1n-20 and the RF processor 1n-10. The signal may include control information and data.

The memory 1n-40 may store data for operations of a main base station, e.g., basic programs, application programs, and configuration information In particular, the memory 1n-40 may store information about bearers allocated for a connected UE, a measurement report transmitted from the connected UE, etc. The memory 1n-40 may store criteria information used to determine whether to provide or release multi-connectivity to or from the UE. The memory 1n-40 may provide the stored data upon request by the controller 1n-50. The memory 1n-40 may be composed of memory media, such as ROM, RAM, hard disks, CD-ROM, and DVDs, or a combination of the memory media. The memory 1n-40 may be composed of a plurality of memories.

The controller 1n-50 may control overall operations of the base station. For example, the controller 1n-50 may transmit and receive signals through the baseband processor 1n-20 and the RF processor 1n-10 or through the transceiver 1n-30. Also, the controller 1n-50 may write data to and read data from the memory 1n-40. To this end, the controller 1n-50 may include at least one processor. According to an embodiment, the controller 1n-50 may include a multi-connectivity processor 1n-52 configured to process a procedures operating in a multi-connectivity mode.

The aforementioned embodiments may be implemented as hardware, software, or a combination of hardware and software.

When implemented as software, a computer-readable memory medium storing one or more programs (e.g., software modules) may be provided. The one or more programs stored in the computer-readable memory medium are configured for execution by one or more processors in an electronic device. The one or more programs include instructions directing the electronic device to execute embodiments of the disclosure as described the specification or in the following claims.

The programs (e.g., software modules or software) may be stored in non-volatile memory (including random access memory (RAM) or flash memory), read only memory (ROM), electrically erasable programmable read only memory (EEPROM), a magnetic disc memory device, a compact disc (CD)-ROM, a digital versatile disc (DVD), another optical memory device, or a magnetic cassette. Alternatively, the programs may be stored in memory including a combination of some or all of the above-mentioned memory media. A plurality of such memories may be included.

In addition, the programs may be stored in an attachable memory device accessible through any or a combination of communication networks such as Internet, an intranet, a local area network (LAN), a wide LAN (WLAN), and a memory area network (SAN). Such a memory device may access the electronic device performing the embodiments of the disclosure via an external port. Furthermore, a separate memory device on the communication network may access the electronic device performing the embodiments of the disclosure.

In the above-described embodiments of the disclosure, the elements included in the disclosure are expressed in a singular or plural form according to the provided specific embodiment of the disclosure. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

According to a disclosed embodiment, in a wireless communication system, a UE may fast perform frequency measurement and transmit a measurement report.

The embodiments of the disclosure disclosed in the specification and drawings are merely presented specific examples to easily explain the technical contents of the disclosure and promote understanding of the disclosure and are not intended to limit the scope of the disclosure. In other words, it is obvious to those skilled in the art that other modifications based on the technical spirit of the disclosure can be implemented. In addition, each of the above embodiments can be combined with each other when necessary to operate. For example, portions of one embodiment of the disclosure and another embodiment may be combined with each other so that a base station and a UE may be operated. Moreover, other modifications based on the technical spirit of the above embodiment may be implemented in various systems such as FDD LTE systems, TDD LTE systems, and 5G or NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for frequency measurement by a user equipment (UE) in a wireless communication system, the method comprising:
   receiving, from a base station, a first frequency measurement configuration;
   transmitting, to the base station, a radio resource control (RRC) resume request message for a RAN notification area (RNA) update in a RRC inactive mode;
   receiving, from the base station, a RRC release message in response to the RRC resume request message; and
   in case that the RRC release message includes a second frequency measurement configuration:
     stopping a timer for the frequency measurement;
     releasing the first frequency measurement configuration;
     starting the timer with a value included in the second frequency measurement configuration; and
     performing frequency measurement based on the second frequency measurement configuration.

2. The method of claim 1, wherein performing the frequency measurement comprises:
   in case that the second frequency measurement configuration includes a frequency measurement list, performing the frequency measurement based on the second frequency measurement configuration.

3. The method of claim 2, wherein the frequency measurement list comprises at least one of an evolved universal mobile telecommunication systems (UMTS) terrestrial radio access (EUTRA) frequency measurement list or a new radio (NR) frequency measurement list.

4. The method of claim 1, wherein performing the frequency measurement comprises:
   in case that the second frequency measurement configuration does not include a frequency measurement list and a system information of a camped on cell includes a third frequency measurement configuration, performing the frequency measurement based on the third frequency measurement configuration.

5. The method of claim 1, further comprising:
   in case that the RRC release message includes a suspend configuration, transiting to the RRC inactive mode.

6. A user equipment (UE) for performing frequency measurement in a wireless communication system, the UE comprising:
   a transceiver; and
   a controller connected to the transceiver, the controller configured to:
     receive, from a base station, a first frequency measurement configuration, transmit, to a base station, a radio resource control (RRC) resume request message for a RAN notification area (RNA) update in a RRC inactive mode,
receive, from the base station, a RRC release message in response to the RRC resume request message, and
in case that the RRC release message includes a second frequency measurement configuration:
- stop a timer for the frequency measurement,
- release the first frequency measurement configuration,
- start the timer with a value included in the second frequency measurement configuration, and
- perform frequency measurement based on the second frequency measurement configuration.

7. The UE of claim 6, wherein the controller is configured to:
in case that the second frequency measurement configuration includes a frequency measurement list, perform the frequency measurement based on the second frequency measurement configuration.

8. The UE of claim 7, wherein the controller is configured to:
in case that the second frequency measurement configuration does not include a frequency measurement list and a system information of a camped on cell includes a third frequency measurement configuration, perform the frequency measurement based on the third frequency measurement configuration.

9. The UE of claim 7, wherein the frequency measurement list comprises at least one of an evolved UMTS terrestrial radio access (EUTRA) frequency measurement list or a new radio (NR) frequency measurement list.

10. The UE of claim 6, wherein the controller is further configured to:
in case that the RRC release message includes a suspend configuration, transit to the RRC inactive mode.

* * * * *